United States Patent
Duthaler et al.

(10) Patent No.: US 11,294,255 B2
(45) Date of Patent: Apr. 5, 2022

(54) COMPONENTS AND METHODS FOR USE IN ELECTRO-OPTIC DISPLAYS

(71) Applicant: E Ink Corporation, Billerica, MA (US)

(72) Inventors: Gregg M. Duthaler, Needham, MA (US); John E. Ritter, Westford, MA (US); Michael L. Steiner, New Richmond, WI (US)

(73) Assignee: E Ink Corporation, Billerica, MA (US)

( * ) Notice: Subject to any disclaimer, the term of this patent is extended or adjusted under 35 U.S.C. 154(b) by 119 days.

(21) Appl. No.: 16/517,730

(22) Filed: Jul. 22, 2019

(65) Prior Publication Data

US 2020/0004097 A1 Jan. 2, 2020

Related U.S. Application Data

(60) Division of application No. 15/687,933, filed on Aug. 28, 2017, now abandoned, which is a division of
(Continued)

(51) Int. Cl.
*G02B 1/14* (2015.01)
*G02F 1/00* (2006.01)
(Continued)

(52) U.S. Cl.
CPC ......... *G02F 1/1675* (2019.01); *B05D 7/5483* (2013.01); *B32B 37/12* (2013.01);
(Continued)

(58) Field of Classification Search
CPC .... G02F 1/1675; G02F 1/1309; G02F 1/1339; G02F 1/167; G02F 1/1681;
(Continued)

(56) References Cited

U.S. PATENT DOCUMENTS

| 3,391,014 A | 7/1968 | Fauser |
| 3,585,381 A | 6/1971 | Hodson et al. |

(Continued)

FOREIGN PATENT DOCUMENTS

| JP | S52139453 A | 11/1977 |
| JP | S55140816 A | 11/1980 |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — Tuyen Tra
(74) *Attorney, Agent, or Firm* — David J. Cole

(57) ABSTRACT

A front plane laminate useful in the manufacture of electro-optic displays comprises, in order, a light-transmissive electrically-conductive layer, a layer of an electro-optic medium in electrical contact with the electrically-conductive layer, an adhesive layer and a release sheet. This front plane laminate can be prepared as a continuous web, cut to size, the release sheet removed and the laminate laminated to a backplane to form a display. Methods for providing conductive vias through the electro-optic medium and for testing the front plane laminate are also described.

7 Claims, 18 Drawing Sheets

Related U.S. Application Data application No. 15/001,308, filed on Jan. 20, 2016, now Pat. No. 9,778,536, which is a division of application No. 14/336,802, filed on Jul. 21, 2014, now Pat. No. 9,733,540, which is a division of application No. 12/959,508, filed on Dec. 3, 2010, now Pat. No. 8,786,929, which is a division of application No. 12/401,170, filed on Mar. 10, 2009, now abandoned, which is a division of application No. 11/928,294, filed on Oct. 30, 2007, now Pat. No. 7,729,039, which is a division of application No. 11/747,546, filed on May 11, 2007, now Pat. No. 7,443,571, which is a continuation of application No. 10/907,065, filed on Mar. 18, 2005, now Pat. No. 7,236,292, which is a division of application No. 10/249,957, filed on May 22, 2003, now Pat. No. 6,982,178.

(60) Provisional application No. 60/320,186, filed on May 12, 2003, provisional application No. 60/319,300, filed on Jun. 10, 2002.

(51) Int. Cl.
*G02F 1/1675* (2019.01)
*G02F 1/167* (2019.01)
*B05D 7/00* (2006.01)
*B32B 37/12* (2006.01)
*B32B 37/18* (2006.01)
*G02F 1/13* (2006.01)
*G02F 1/1339* (2006.01)
*G02F 1/1681* (2019.01)

(52) U.S. Cl.
CPC ............ *B32B 37/18* (2013.01); *G02B 1/14* (2015.01); *G02F 1/1309* (2013.01); *G02F 1/1339* (2013.01); *G02F 1/167* (2013.01); *B32B 2307/202* (2013.01); *B32B 2457/20* (2013.01); *G02F 1/1681* (2019.01); *G02F 2001/1678* (2013.01); *G02F 2202/28* (2013.01); *G02F 2203/69* (2013.01); *Y10T 156/10* (2015.01); *Y10T 428/1476* (2015.01)

(58) Field of Classification Search
CPC ......... G02F 2001/1678; G02F 2202/28; G02F 2203/69; G02B 1/14; B05D 7/5483; B32B 37/12; B32B 37/18; B32B 2307/202; B32B 2457/20; Y10T 428/1476; Y10T 156/10
See application file for complete search history.

(56) References Cited

U.S. PATENT DOCUMENTS

| | | |
|---|---|---|
| 3,668,106 A | 6/1972 | Ota |
| 3,756,693 A | 9/1973 | Ota |
| 3,767,392 A | 10/1973 | Ota |
| 3,772,013 A | 11/1973 | Wells |
| 3,792,308 A | 2/1974 | Ota |
| 3,870,517 A | 3/1975 | Ota et al. |
| 3,892,568 A | 7/1975 | Ota |
| 3,959,906 A | 6/1976 | Norris, Jr. et al. |
| 4,077,936 A | 3/1978 | Tanaka et al. |
| 4,093,534 A | 6/1978 | Carter et al. |
| 4,160,257 A | 7/1979 | Carrish |
| 4,161,557 A | 7/1979 | Suzuki et al. |
| 4,201,450 A | 5/1980 | Trapani |
| 4,272,596 A | 6/1981 | Harbour et al. |
| 4,305,807 A | 12/1981 | Somlyody |
| 4,310,577 A | 1/1982 | Davison et al. |
| 4,387,133 A | 6/1983 | Ichikawa et al. |
| 4,418,346 A | 11/1983 | Batchelder |
| 4,466,701 A | 8/1984 | Ogata et al. |
| 4,522,472 A | 6/1985 | Liebert et al. |
| 4,550,982 A | 11/1985 | Hirai |
| 4,602,263 A | 7/1986 | Borror et al. |
| 4,655,897 A | 4/1987 | DiSanto et al. |
| 4,681,403 A | 7/1987 | Te Velde et al. |
| 4,703,573 A | 11/1987 | Montgomery et al. |
| 4,742,345 A | 5/1988 | DiSanto et al. |
| 4,746,917 A | 5/1988 | DiSanto et al. |
| 4,818,075 A | 4/1989 | Takao et al. |
| 4,900,414 A | 2/1990 | Sibalis |
| 4,902,108 A | 2/1990 | Byker |
| 5,189,537 A | 2/1993 | O'Farrell |
| 5,250,938 A | 10/1993 | DiSanto et al. |
| 5,276,438 A | 1/1994 | DiSanto et al. |
| 5,288,433 A | 2/1994 | Stevens |
| 5,293,528 A | 3/1994 | DiSanto et al. |
| 5,378,404 A | 1/1995 | Han et al. |
| 5,402,145 A | 3/1995 | DiSanto et al. |
| 5,412,398 A | 5/1995 | DiSanto et al. |
| 5,467,107 A | 11/1995 | DiSanto et al. |
| 5,484,292 A | 1/1996 | McTaggart |
| 5,485,176 A | 1/1996 | Ohara et al. |
| 5,543,729 A | 8/1996 | Henley |
| 5,548,282 A | 8/1996 | Escritt et al. |
| 5,561,443 A | 10/1996 | DiSanto et al. |
| 5,745,094 A | 4/1998 | Gordon, II et al. |
| 5,760,761 A | 6/1998 | Sheridon |
| 5,777,782 A | 7/1998 | Sheridon |
| 5,786,589 A | 7/1998 | Segawa et al. |
| 5,800,950 A | 9/1998 | Hirao et al. |
| 5,808,783 A | 9/1998 | Crowley |
| 5,825,526 A | 10/1998 | Bommarito et al. |
| 5,872,552 A | 2/1999 | Gordon, II et al. |
| 5,930,026 A | 7/1999 | Jacobson et al. |
| 5,961,804 A | 10/1999 | Jacobson et al. |
| 5,984,478 A | 11/1999 | Doany et al. |
| 6,017,584 A | 1/2000 | Albert et al. |
| 6,025,896 A | 2/2000 | Hattori et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,105,290 A | 8/2000 | Coates |
| 6,111,623 A | 8/2000 | Sato |
| 6,113,810 A | 9/2000 | Hou et al. |
| 6,117,368 A | 9/2000 | Hou |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,056 A | 10/2000 | Kubota et al. |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,151,153 A | 11/2000 | Bryan |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,194,488 B1 | 2/2001 | Chen et al. |
| 6,204,953 B1 | 3/2001 | Zieba et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 | 7/2001 | Albert et al. |
| 6,262,833 B1 | 7/2001 | Loxley et al. |
| 6,268,092 B1 | 7/2001 | Akashi et al. |
| 6,271,823 B1 | 8/2001 | Gordon, II et al. |
| 6,285,433 B1 | 9/2001 | Kawasaki |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |

(56) References Cited

U.S. PATENT DOCUMENTS

| | | |
|---|---|---|
| 6,323,989 B1 | 11/2001 | Jacobson et al. |
| 6,327,072 B1 | 12/2001 | Comiskey et al. |
| 6,330,054 B1 | 12/2001 | Ikami |
| 6,337,761 B1 | 1/2002 | Rogers et al. |
| 6,368,758 B1 | 4/2002 | Camp et al. |
| 6,376,828 B1 | 4/2002 | Comiskey |
| 6,377,387 B1 | 4/2002 | Duthaler et al. |
| 6,392,678 B2 | 5/2002 | Nakamura et al. |
| 6,392,785 B1 | 5/2002 | Albert et al. |
| 6,392,786 B1 | 5/2002 | Albert |
| 6,400,492 B1 | 6/2002 | Morita et al. |
| 6,404,339 B1 | 6/2002 | Eberhardt |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,200 B1 | 10/2002 | Moore |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,493,050 B1 | 12/2002 | Lien et al. |
| 6,498,114 B1 | 12/2002 | Amundson et al. |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,515,790 B2 | 2/2003 | Miyamoto et al. |
| 6,517,995 B1 | 2/2003 | Jacobson et al. |
| 6,518,949 B2 | 2/2003 | Drzaic |
| 6,521,489 B2 | 2/2003 | Duthaler et al. |
| 6,521,511 B1 | 2/2003 | Inoue et al. |
| 6,525,865 B2 | 2/2003 | Katase |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,652,075 B2 | 11/2003 | Jacobson |
| 6,657,772 B2 | 12/2003 | Loxley |
| 6,661,487 B2 | 12/2003 | Takahashi et al. |
| 6,661,563 B2 | 12/2003 | Hayashi et al. |
| 6,664,944 B1 | 12/2003 | Albert et al. |
| 6,671,030 B2 | 12/2003 | Gyoda |
| D485,294 S | 1/2004 | Albert |
| 6,672,921 B1 | 1/2004 | Liang et al. |
| 6,680,517 B2 | 1/2004 | Namba |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,720,375 B2 | 4/2004 | Suzuki et al. |
| 6,721,083 B2 | 4/2004 | Jacobson et al. |
| 6,723,392 B2 | 4/2004 | Jinnai et al. |
| 6,724,519 B1 | 4/2004 | Morrison et al. |
| 6,727,881 B1 | 4/2004 | Albert et al. |
| 6,731,367 B1 | 5/2004 | Saitoh |
| 6,734,942 B2 | 5/2004 | Takeuchi |
| 6,738,050 B2 | 5/2004 | Comiskey et al. |
| 6,741,386 B2 | 5/2004 | Minami |
| 6,750,473 B2 | 6/2004 | Amundson et al. |
| 6,753,999 B2 | 6/2004 | Zehner et al. |
| 6,788,449 B2 | 9/2004 | Liang et al. |
| 6,788,450 B2 | 9/2004 | Kawai et al. |
| 6,816,146 B2 | 11/2004 | Harada et al. |
| 6,816,147 B2 | 11/2004 | Albert |
| 6,819,471 B2 | 11/2004 | Amundson et al. |
| 6,822,782 B2 | 11/2004 | Honeyman et al. |
| 6,825,068 B2 | 11/2004 | Denis et al. |
| 6,825,829 B1 | 11/2004 | Albert et al. |
| 6,825,970 B2 | 11/2004 | Goenaga et al. |
| 6,831,769 B2 | 12/2004 | Holman et al. |
| 6,839,158 B2 | 1/2005 | Albert et al. |
| 6,842,167 B2 | 1/2005 | Albert |
| 6,842,279 B2 | 1/2005 | Amundson |
| 6,842,657 B1 | 1/2005 | Drzaic |
| 6,845,184 B1 | 1/2005 | Yoshimura et al. |
| 6,859,247 B2 | 2/2005 | Murade et al. |
| 6,864,875 B2 | 3/2005 | Drzaic |
| 6,865,010 B2 | 3/2005 | Duthaler et al. |
| 6,866,760 B2 | 3/2005 | Paolini, Jr. et al. |
| 6,870,657 B1 | 3/2005 | Fitzmaurice et al. |
| 6,870,661 B2 | 3/2005 | Pullen et al. |
| 6,876,476 B1 | 4/2005 | Miura et al. |
| 6,891,672 B2 | 5/2005 | Whitehead et al. |
| 6,900,851 B2 | 5/2005 | Morrison et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,967,640 B2 | 11/2005 | Albert et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,012,600 B2 | 3/2006 | Zehner et al. |
| 7,012,735 B2 | 3/2006 | Honeyman et al. |
| 7,023,420 B2 | 4/2006 | Comiskey et al. |
| 7,030,412 B1 | 4/2006 | Drzaic et al. |
| 7,030,854 B2 | 4/2006 | Baucom et al. |
| 7,034,783 B2 | 4/2006 | Gates et al. |
| 7,038,655 B2 | 5/2006 | Herb et al. |
| 7,069,943 B2 | 7/2006 | Gilbert et al. |
| 7,071,913 B2 | 7/2006 | Albert et al. |
| 7,106,296 B1 | 9/2006 | Jacobson |
| 7,109,968 B2 | 9/2006 | Albert et al. |
| 7,110,163 B2 | 9/2006 | Webber et al. |
| 7,116,318 B2 | 10/2006 | Amundson et al. |
| 7,119,772 B2 | 10/2006 | Amundson et al. |
| 7,158,282 B2 | 1/2007 | Liang et al. |
| 7,167,155 B1 | 1/2007 | Albert et al. |
| 7,170,670 B2 | 1/2007 | Webber |
| 7,176,880 B2 | 2/2007 | Amundson et al. |
| 7,193,625 B2 | 3/2007 | Danner et al. |
| 7,202,847 B2 | 4/2007 | Gates |
| 7,223,672 B2 | 5/2007 | Kazlas et al. |
| 7,236,290 B1 | 6/2007 | Zhang et al. |
| 7,236,292 B2 | 6/2007 | LeCain |
| 7,256,766 B2 | 8/2007 | Albert et al. |
| 7,259,744 B2 | 8/2007 | Arango et al. |
| 7,280,094 B2 | 10/2007 | Albert |
| 7,312,916 B2 | 12/2007 | Pullen et al. |
| 7,339,715 B2 | 3/2008 | Webber et al. |
| 7,365,733 B2 | 4/2008 | Duthaler et al. |
| 7,488,513 B2 | 2/2009 | Sakai et al. |
| 7,528,822 B2 | 5/2009 | Amundson et al. |
| 7,551,345 B2 | 6/2009 | Uchida |
| 7,561,324 B2 | 7/2009 | Duthaler et al. |
| 7,667,684 B2 | 2/2010 | Jacobson et al. |
| 7,728,811 B2 | 6/2010 | Albert et al. |
| 7,893,435 B2 | 2/2011 | Kazlas et al. |
| 7,952,557 B2 | 5/2011 | Amundson et al. |
| 8,129,655 B2 | 3/2012 | Jacobson et al. |
| 8,330,712 B2 * | 12/2012 | Park ............ G02F 1/1677 345/107 |
| 8,422,116 B2 | 4/2013 | Sprague et al. |
| 8,466,852 B2 | 6/2013 | Drzaic et al. |
| 2001/0055000 A1 | 12/2001 | Kanae et al. |
| 2002/0060321 A1 | 5/2002 | Kazlas et al. |
| 2002/0090980 A1 | 7/2002 | Wilcox et al. |
| 2002/0106874 A1 | 8/2002 | Iwane et al. |
| 2002/0113770 A1 | 8/2002 | Jacobson et al. |
| 2003/0102858 A1 | 6/2003 | Jacobson et al. |
| 2004/0105036 A1 | 6/2004 | Danner et al. |
| 2004/0119681 A1 | 6/2004 | Albert et al. |
| 2005/0012980 A1 | 1/2005 | Wilcox et al. |
| 2005/0018273 A1 | 1/2005 | Honeyman et al. |

FOREIGN PATENT DOCUMENTS

| | | | |
|---|---|---|---|
| JP | 57207222 A * | 12/1982 | ............ G02F 1/0338 |
| JP | S59171930 A | 9/1984 | |
| JP | S61270734 A | 5/1985 | |
| JP | S62269124 A | 11/1987 | |
| JP | S6486116 A | 3/1989 | |

(56) References Cited

FOREIGN PATENT DOCUMENTS

| | | |
|---|---|---|
| JP | H01248182 A | 10/1989 |
| JP | H01267525 A | 10/1989 |
| JP | H02284125 A | 11/1990 |
| JP | H03168613 A | 7/1991 |
| JP | H0324512 A | 10/1991 |
| JP | H0416863 A | 1/1992 |
| JP | H04166918 A | 6/1992 |
| JP | H05313211 A | 11/1993 |
| JP | H08278491 A | 10/1996 |
| JP | H09244560 A | 9/1997 |
| JP | H10149118 A | 6/1998 |
| JP | H1124410 A | 1/1999 |
| JP | H11126035 A | 5/1999 |
| JP | 2000284262 A | 10/2000 |
| JP | 2001026758 A | 1/2001 |
| JP | 2001117123 A | 4/2001 |
| JP | 2001209079 A | 8/2001 |
| JP | 2001242806 A | 9/2001 |
| JP | 2002098945 A | 4/2002 |
| JP | 2002202532 A | 7/2002 |
| JP | 2002365669 A | 12/2002 |
| JP | 2003156770 A | 5/2003 |
| JP | 2008209695 A | 9/2008 |
| KR | 20020028014 A | 4/2002 |
| WO | 1982002961 A1 | 9/1982 |
| WO | 1999053373 A1 | 10/1999 |
| WO | 1999067678 A2 | 12/1999 |
| WO | 2000005704 A1 | 2/2000 |
| WO | 2000036560 A1 | 6/2000 |
| WO | 2000038000 A1 | 6/2000 |
| WO | 2000067110 A1 | 11/2000 |
| WO | 2001092359 A1 | 12/2001 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, Udo. et al., "Nanomaterials-Based Electrochromics for Paper-Quality Displays", Adv. Mater, vol. 14, No. 11, pp. 845-848, (Jun. 5, 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

Chen, Y., et al., "A Conformable Electronic Ink Display using a Foil-Based a-Si TFT Array", SID 01 Digest, pp. 157-159 (Jun. 2001). Jun. 30, 2001.

Comiskey, B., et al., "An electrophoretic ink for all-printed reflective electronic displays", Nature, 394, pp. 253-255 (1998). Dec. 31, 1998.

Comiskey, B., et al., "Electrophoretic Ink: A Printable Display Material", SID 97 Digest, pp. 75-76 (1997). Dec. 31, 1997.

Drzaic, P., et al., "A Printed and Rollable Bistable Electronic Display", SID 98 Digest, pp. 1131-1134 (1998). Dec. 31, 1998.

Duthaler, G. et al., "Active-Matrix Color Displays Using Electrophoretic Ink and Color Filters", SID 02 Digest, pp. 1374-1377 (2002). Dec. 31, 2002.

Jacobson, J., et al., "The last book", IBM Systems J., 36, 457 (1997) Dec. 31, 1997.

Jo, G-R, et al., "Toner Display Based on Particle Movements", Chem. Mater, 14, pp. 664-669 (2002). Dec. 31, 2002.

Kazlas, P., et al., "12.1" SVGA Microencapsulated Electrophoretic Active Matrix Display for Information Appliances", SID 01 Digest, pp. 152-155 (Jun. 2001). Jun. 30, 2001.

Pitt, M.G., et al., "Power Consumption of Microencapsulated Electrophoretic Displays for Smart Handheld Applications", SID 02 Digest, pp. 1378-1381 (2002). Dec. 31, 2002.

Webber, R., "Image Stability in Active-Matrix Microencapsulated Electrophoretic Displays", SID 02 Digest, pp. 126-129 (2002). Dec. 31, 2002.

Amundson, Karl, et al., "12.3: Flexible, Active-Matrix Display Constructed Using a Microencapsulated Electrophoretic Material and an Organic-Semiconductor-Based Backplane", SID 01 Digest, pp. 160-163 (Jun. 2001). Jun. 30, 2001.

Croucher, M.D., et al., "Electrophoretic Display: Materials as Related to Performance", Photographic Science and Engineering, vol. 25, No. 2, (Mar. / Apr. 1981) Mar. 1, 1981.

Ota, I. et al., "Developments in Electrophoretic Displays", Proceedings of the SID, 18, 243 (1977) Dec. 31, 1977.

Shiwa, S. et al., "Electrophoretic Display Method Using Ionographic Technology," SID 88 Digest (1988), p. 61 Dec. 31, 1988.

Dalisa, Andrew L., "Electrophoretic Display Technology", IEEE Transactions on Electron Devices., vol. ED-24, No. 7, p. 827-834, (Jul. 1977). Jul. 1, 1977.

Gutcho, M.H., Microcapsules and MIcroencapsulation Techniques, Noyes Data Corp., Park Ridge NJ, (1976) Dec. 31, 1976.

\* cited by examiner

COMPONENTS AND METHODS FOR USE IN ELECTRO-OPTIC DISPLAYS

REFERENCE TO RELATED APPLICATIONS

This application is a divisional of application Ser. No. 15/687,933, filed Aug. 28, 2017 (Publication No. 2017/0357138), which is itself is a divisional of application Ser. No. 15/001,308, filed Jan. 20, 2016 (Publication No. 2016/0139481, now U.S. Pat. No. 9,778,536, issued Oct. 3, 2017), which is itself a divisional of application Ser. No. 14/336,802, filed Jul. 21, 2014 (Publication No. 2014/0340738, now U.S. Pat. No. 9,733,540, issued Aug. 15, 2017), which is itself a divisional of application Ser. No. 12/959,508, filed Dec. 3, 2010 (Publication No. 2011/0075248, now U.S. Pat. No. 8,786,929, issued Jul. 22, 2014), which is a divisional of application Ser. No. 12/401,170, filed Mar. 10, 2009 (Publication No, 2009/0168067, now abandoned), which is a divisional of application Ser. No. 11/928,294, filed Oct. 30, 2007 (Publication No. 2008/0054879, now U.S. Pat. No. 7,729,039, issued Jun. 1, 2010), which is a divisional of application Ser. No. 11/747,546, filed May 11, 2007 (now U.S. Pat. No. 7,443,571, issued Oct. 28, 2008), which is a continuation of application Ser. No. 10/907,065, filed Mar. 18, 2005 (now U.S. Pat. No. 7,236,292, issued. Jun. 26, 2007), which is itself a divisional of application Ser. No. 10/249,957, filed May 22, 2003 (now U.S. Pat. No. 6,982,178, issued Jan. 3, 2006), which is turn claims priority from Application Ser. No. 60/319,300, filed Jun. 10, 2002, and from Application Ser. No. 60/320,186, filed May 12, 2003. The entire contents of all United States Patents and published Applications mentioned above and below are Herein incorporated by reference.

BACKGROUND OF INVENTION

The present invention relates to processes and components for forming electro-optic displays. More specifically, this invention relates to such processes and components for forming electro-optic displays containing an electro-optic medium which is a solid (such displays may hereinafter for convenience be referred to as "solid electro-optic displays"), in the sense that the electro-optic medium has solid external surfaces, although the medium may, and often does, have internal liquid- or gas-filled spaces, and to methods for assembling displays using such an electro-optic medium. Thus, the term "solid electro-optic displays" includes encapsulated electrophoretic displays, encapsulated liquid crystal displays, and other types of displays discussed below.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. Patent Application No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed to applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 Mar. 2002. See also Bach, U., et al., Adv. Mater., 2002, 14(11), 845. Nanochromic films of this type are also described, for example, in U.S. Pat. No. 6,301,038, International Application Publication No. WO 01/27690, and in copending application Ser. No. 10/249,128, filed Mar. 18, 2003. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961, 804; 6,017,584; 6,067,185; 6,118,426; 6,120,588; 6,120, 839; 6,124,851; 6,130,773; 6,130,774; 6,172,798; 6,177, 921; 6,232,950; 6,249,271; 6,252,564; 6,262,706; 6,262, 833; 6,300,932; 6,312,304; 6,312,971; 6,323,989; 6,327, 072; 6,376,828; 6,377,387; 6,392,785; 6,392,786; 6,413, 790; 6,422,687; 6,445,374; 6,445,489; 6,459,418; 6,473, 072; 6,480,182; 6,498,114; 6,504,524; 6,506,438; 6,512, 354; 6,515,649; 6,518,949; 6,521,489; 6,531,997; 6,535, 197; 6,538,801; and 6,545,291; and U.S. Patent Applications Publication Nos. 2002/0019081; 2002/0021270; 2002/ 0053900; 2002/0060321; 2002/0063661; 2002/0063677; 2002/0090980; 2002/0106847; 2002/0113770; 2002/ 0130832; 2002/0131147; 2002/0145792; 2002/0154382, 2002/0171910; 2002/0180687; 2002/0180688; 2002/ 0185378; 2003/0011560; 2003/0011867; 2003/0011868; 2003/0020844; 2003/0025855; 2003/0034949; 2003/ 0038755; and 2003/0053189; and International Applications Publication Nos. WO 99/67678; WO 00/05704; WO 00/20922; WO 00/26761; WO 00/38000; WO 00/38001; WO 00/36560; WO 00/67110; WO 00/67327; WO 01/07961; and WO 01/08241.

Many of the aforementioned patents and applications recognize that the walls surrounding the discrete microcapsules in an encapsulated electrophoretic medium could be replaced by a continuous phase, thus producing a so-called polymer-dispersed electrophoretic display in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed (using a variety of methods), the display itself can be made inexpensively.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002-0075556, both assigned to Sipix Imaging, Inc.

Although electrophoretic displays are often opaque (since the particles substantially block transmission of visible light through the display) and operate in a reflective mode, electrophoretic displays can be made to operate in a so-called "shutter mode" in which the particles are arranged to move laterally within the display so that the display has one display state which is substantially opaque and one which is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

Many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

As discussed in the aforementioned U.S. Pat. No. 6,312, 304, the manufacture of solid electro-optic displays also presents problems in that the optical components (the electro-optic medium) and the electronic components (in the backplane) have differing performance criteria. For example, it is desirable for the optical components to optimize reflectivity, contrast ratio and response time, while it is desirable for the electronic components to optimize conductivity, voltage-current relationship, and capacitance, or to possess memory, logic, or other higher-order electronic device capabilities. Therefore, a process for manufacturing an optical component may not be ideal for manufacturing an electronic component, and vice versa. For example, a process for manufacturing an electronic component can involve processing under high temperatures. The processing temperature can be in the range from about 300° C. to about 600° C. Subjecting many optical components to such high temperatures, however, can be harmful to the optical components by degrading the electro-optic medium chemically or by causing mechanical damage.

This patent describes a method of manufacturing an electro-optical display comprising providing a modulating layer including a first substrate and an electro-optical material provided adjacent the first substrate, the modulating layer being capable of changing a visual state upon application of an electric field; providing a pixel layer comprising a second substrate, a plurality of pixel electrodes provided on a front surface of the second substrate and a plurality of contact pads provided on a rear surface of the second substrate, each pixel electrode being connected to a contact pad through a via extending through the second substrate; providing a circuit layer including a third substrate and at least one circuit element; and laminating the modulating layer, the pixel layer, and the circuit layer to form the electro-optical display.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, the prior art methods for final lamination of solid electro-optic displays are essentially batch methods in which the electro-optic medium, the lamination adhesive and the backplane are only brought together immediately prior to final assembly, and it is desirable to provide methods better adapted for mass production.

The present invention seeks to provide electro-optic components of a solid electro-optic display, these components being well adapted for mass production. This invention also seeks to provide processes for the assembly of solid electro-optic displays using these components.

The present invention also seeks to provide methods for testing electro-optic components prior to final assembly of displays.

One practical problem in the manufacture of electro-optic displays, especially flexible displays, is sealing the display to prevent ingress of materials from the environment (and/or, in some cases, egress of components of the electro-optic medium). For example, organic light emitting diodes (which may be useful as the electro-optic medium of a display) are notoriously sensitive to damage caused in ingress of atmospheric moisture, and some particle-based electrophoretic media have also been shown to have some sensitivity to moisture. In another aspect, this invention provides sealed electro-optic displays.

SUMMARY OF THE INVENTION

Accordingly, in one aspect this invention provides an article of manufacture (hereinafter sometimes referred to as a "front plane laminate") comprising, in order:
  a light-transmissive electrically-conductive layer;
  a layer of a solid electro-optic medium in electrical contact with the electrically-conductive layer;
  an adhesive layer; and
  a release sheet.

In such a front plane laminate, the electrically-conductive layer may comprise a metal oxide, for example indium tin oxide. Although the front plane laminate may use a solid electro-optic medium of any of the aforementioned types, for example, a rotating bichromal member medium or an electrochromic medium, it is generally preferred that the electro-optic medium be an electrophoretic medium, desirably an encapsulated electrophoretic medium.

The adhesive layer used in the front plane laminate may be a heat activated adhesive or a pressure sensitive adhesive, depending upon the conditions under which the front plane laminate is to be laminated to a backplane, as described in more detail below.

A preferred form of the front plane laminate has a connection area where the electrically-conductive layer is exposed free from the electro-optic medium and the adhesive layer. This connection area may be is formed by an aperture extending through the electro-optic medium and the adhesive layer so that the connection area is surrounded by the electro-optic medium and the adhesive layer. Desirably, the release sheet does not extend across the connection area. For reasons explained in more detail below, a contact pad of electrically-conductive material may be provided overlying the electrically-conductive layer in the connection area.

The front plane laminate may have a conductive via in electrical contact with the electrically-conductive layer and extending therefrom through or past the layer of electro-optic medium and the adhesive layer. In this form of front plane laminate, desirably the end of the conductive via remote from the electrically-conductive layer is not covered by the release sheet. The conductive via may be formed from a deformable material, such as a material comprising conductive particles dispersed in a polymeric matrix. A contact pad of electrically-conductive material may be interposed between the electrically-conductive layer and the conductive via.

The release sheet of the front plane laminate may be provided with a second electrically-conductive layer. This second electrically-conductive layer may be provided on either surface of the release sheet, but will typically be provided on the surface closer to the electro-optic medium. As described below, this second electrically-conductive layer is useful in testing the front plane laminate before its incorporation into a display. Alternatively or in addition, the front plane laminate may have an auxiliary adhesive layer on the opposed side of the electrically-conductive layer from the electro-optic medium; an auxiliary release sheet may be provided covering the auxiliary adhesive layer.

In another aspect this invention provides an second article of manufacture (or front plane laminate) comprising, in order: a light-transmissive electrically-conductive layer; a layer of a solid electro-optic medium in electrical contact with the electrically-conductive layer; and an adhesive layer. This article of manufacture has a connection area wherein the electrically-conductive layer is exposed free from the electro-optic medium and the adhesive layer.

In this front plane laminate, the connection area may or may not extend to an edge of the laminate, but the latter is generally preferred, so that the connection area is formed by an aperture extending through the electro-optic medium and the adhesive layer so that the connection area is surrounded by the electro-optic medium and the adhesive layer. The front plane laminate may further comprise a release sheet disposed adjacent the adhesive layer on the opposed side thereof from the layer of electro-optic medium. The release sheet may not extend across the connection area. The release sheet may be provided with a second electrically-conductive layer. The front plane laminate may further comprise a contact pad of electrically-conductive material overlying the electrically-conductive layer in the connection area; for reasons explained below, the presence of such a contact pad in effect provides a desirable area of increased thickness in the electrically-conductive layer in the connection area. Although this front plane laminate may use a solid electro-optic medium of any of the aforementioned types, it is generally preferred that the electro-optic medium be an electrophoretic medium, desirably an encapsulated electrophoretic medium.

In another aspect, this invention provides a third article of manufacture (front plane laminate) comprising, in order: a light-transmissive electrically-conductive layer; a layer of a solid electro-optic medium in electrical contact with the electrically-conductive layer; and an adhesive layer. However, the third front plane laminate of the invention further comprises a conductive via in electrical contact with the electrically-conductive layer and extending therefrom through or past the layer of electro-optic medium and the adhesive layer.

The third front plane laminate of the present invention may further comprise a release sheet disposed adjacent the adhesive layer on the opposed side thereof from the layer of electro-optic medium. The end of the conductive via remote from the electrically-conductive layer may not be covered by the release sheet. The conductive via may be formed from a deformable material, for example a material comprising conductive particles dispersed in a polymeric matrix. Like the other front plane laminates of the invention, and for the same reasons, the third front plane laminate may further comprise a contact pad of electrically-conductive material overlying the electrically-conductive layer in the connection area. Although the third front plane laminate may use a solid electro-optic medium of any of the aforementioned types, it is generally preferred that the electro-optic medium be an electrophoretic medium, desirably an encapsulated electrophoretic medium.

The invention also provides an electro-optic display comprising, in order: a light-transmissive electrically-conductive layer; a layer of a solid electro-optic medium in electrical contact with the electrically-conductive layer; an adhesive layer; and a backplane having at least one pixel electrode, such that application of an electrical potential between the electrically-conductive layer and the pixel electrode can change the optical state of the electro-optic medium, the backplane further comprising at least one contact pad electrically isolated from the at least one pixel electrode. This display further comprises at least one conductive via extending from the electrically-conductive layer through or past the electro-optic medium and the adhesive layer to the or one of the contact pads.

As already indicated, in this display the conductive via may extend through or past the electro-optic medium, but the former arrangement is generally preferred, whereby the conductive via extends through the electro-optic medium and the adhesive layer so that the conductive via is completely surrounded by the electro-optic medium and the adhesive layer. The conductive via may be formed from a deformable material, for example a material comprising conductive particles dispersed in a polymeric matrix. Although the display may use a solid electro-optic medium of any of the aforementioned types, it is generally preferred that the electro-optic medium be an electrophoretic medium, desirably an encapsulated electrophoretic medium.

The electro-optic display of the present invention may be provided with a protective and/or barrier layer disposed on the opposed side of the electrically-conductive layer from the electro-optic medium. A layer of transparent adhesive may be used to secure the protective and/or barrier layer to the electrically-conductive layer. The electro-optic display may have a sealing material disposed around at least part of the periphery of the layer of electro-optic medium. In one form of such a sealed display, a protective and/or barrier layer is provided extending beyond the periphery of the electro-optic medium, and a sealing material is placed around at least part of the periphery of the electro-optic medium between the protective and/or barrier layer and the backplane.

In another aspect, this invention provides a process for producing a solid electro-optic display. This process comprises providing an article of manufacture comprising, in order: a light-transmissive electrically-conductive layer; a layer of a solid electro-optic medium in electrical contact with the electrically-conductive layer; an adhesive layer; and a release sheet. The process further comprises providing a backplane comprising a plurality of pixel electrodes and drive means arranged to apply variable potentials to the pixel electrodes. The process also comprises removing the release sheet from the adhesive layer; and contacting the adhesive layer with the backplane under conditions effect to cause the adhesive layer to adhere to the backplane, thereby securing the adhesive layer, layer of electro-optic medium and electrically-conductive layer to the backplane.

In this process, the contacting of the adhesive layer with the backplane is desirably effected under about 20 to about 60 percent relative humidity. As described in more detail below, to prevent problems due to electrostatic discharge, the process may include applying ionized particles to the front plane laminate during at least one of the removal of the release sheet from the adhesive layer and the contacting of the adhesive layer with the backplane.

In this process, the front plane laminate may be provided with a connection area where the electrically conductive layer is exposed free from the electro-optic medium and the adhesive layer, the backplane be provided with a contact pad electrically isolated from the pixel electrodes, and the process place the connection area in electrical contact with the contact pad. The connection area may be formed by an aperture extending through the electro-optic medium and the adhesive layer and a deformable electrically-conductive material be placed on the contact pad prior to contacting the adhesive layer with the backplane, so that during the contacting of the adhesive layer with the backplane, the deformable electrically-conductive material enters the aperture and forms a conductive via electrically connecting the contact pad to the electrically conductive layer. Alternatively, the connection area may be provided with a conductive via extending from the electrically conductive layer through the electro-optic medium and the adhesive layer, and the process place the conductive via in electrical contact with the contact pad.

The process may include providing a protective and/or barrier layer on the opposed side of the electrically-conductive layer from the electro-optic medium. For this purpose, the front plane laminate may include an auxiliary adhesive layer on the opposed side of the electrically-conductive layer from the electro-optic medium, and the process adhere the protective and/or barrier layer to the auxiliary adhesive layer. The front plane laminate may have an auxiliary release sheet covering the auxiliary adhesive layer, and the process include a step of removing the auxiliary release sheet from the auxiliary adhesive layer before the auxiliary adhesive layer is adhered to the protective and/or barrier layer.

In this process, the release sheet may be provided with a second electrically-conductive layer, and the process include applying between the light-transmissive electrically-conductive layer and the second electrically-conductive layer a voltage sufficient to change the optical state of the electro-optic medium.

Although this process may use an electro-optic medium of any of the aforementioned types, such as a rotating bichromal member medium or an electrochromic medium, desirably the electro-optic medium is an electrophoretic medium, preferably an encapsulated electrophoretic medium.

In another aspect, this invention provides a process for forming an electro-optic display. This process comprises:

providing a front assembly comprising, in order, a light-transmissive electrically-conductive layer; a layer of a solid electro-optic medium in electrical contact with the electrically-conductive layer; and an adhesive layer;

removing the electro-optic medium and the adhesive layer from a portion of the front assembly, thereby providing a connection area wherein the electrically-conductive layer is exposed free from the electro-optic medium and the adhesive layer;

forming a conductive via on the connection area;

providing a backplane comprising at least one pixel electrode and at least one contact pad electrically isolated from the at least one pixel electrode; and laminating the front assembly to the backplane so that the adhesive layer adheres to the backplane with the electro-optic medium disposed adjacent the at least one pixel electrode and the conductive via in electrical contact with the at least one contact pad, so that the electrically-conductive layer is electrically connected to the at least one contact pad via the conductive via.

In this process, the connection area may be formed by an aperture extending through the electro-optic medium and the adhesive layer so that the connection area is surrounded by the electro-optic medium and the adhesive layer. The front assembly may comprise a release sheet disposed adjacent the adhesive layer on the opposed side thereof from the layer of electro-optic medium, and this release sheet be removed from the adhesive layer before the front assembly is laminated to the backplane. When such a release sheet is present, the step of removing the electro-optic medium and the adhesive layer from a portion of the front assembly may also include removing the release sheet from a portion of the front assembly, so that the connection area is free from the release sheet. The release sheet may provided with a second electrically-conductive layer, and the process may include applying between the light-transmissive electrically-conductive layer and the second electrically-conductive layer a voltage sufficient to change the optical state of the electro-optic medium.

In this process of the present invention, the conductive via may be formed from a deformable material, for example a material comprising conductive particles in a polymeric matrix.

In this process of the invention, the conductive via may be present in the front assembly prior to the lamination step, or may be formed during the lamination step. In the latter case, the material which will form the conductive via may be placed on the backplane prior to the lamination step, so that formation of the conductive via occurs during the lamination of the front assembly to the backplane. For reasons explained briefly above and in detail below, the front assembly may have a front contact pad of electrically-conductive material overlying part of the electrically-conductive layer, and the connection area may be formed so as to expose at least part of the front contact pad.

In this process of the present invention, the front assembly may have a layer of transparent adhesive on the opposed side of the electrically-conductive layer from the electro-optic medium, and a second release sheet disposed adjacent the layer of transparent adhesive, and the process may include removing the second release sheet from the layer of transparent adhesive and laminating the layer of transparent adhesive to a protective and/or barrier layer. Typically, the removal of the second release sheet and the lamination of the layer of transparent adhesive will be effected after lamination of the front assembly to the backplane.

In this process of the invention, after lamination of the front assembly to the backplane, a sealing material may be placed around at least part of the periphery of the front assembly. When the display is provided with a protective and/or barrier layer as previously described, this protective and/or barrier layer may extend beyond the periphery of the electro-optic medium, and the sealing material be placed around at least part of the periphery of the electro-optic medium between the protective and/or barrier layer and the backplane.

This invention also provides a further process for forming an electro-optic display. This further process comprises:

providing a substrate comprising a light-transmissive electrically-conductive layer;

coating a solid electro-optic medium over part of the substrate, leaving a connection area of the substrate uncoated;

coating an adhesive layer over the electro-optic medium, leaving the connection area uncoated, thereby forming a front assembly;

providing a backplane comprising at least one pixel electrode and a contact pad electrically isolated from the at least one pixel electrode; and laminating the front assembly to the backplane so that the adhesive layer adheres to the backplane with the electro-optic medium disposed adjacent the at least one pixel electrode and with the electrically-conductive layer in the connection area in electrical contact with the contact pad.

This process of the present invention may include placing a release sheet over the adhesive layer, the release sheet being removed from the adhesive layer before lamination of the front assembly to the backplane. The release sheet may be provided with a second electrically-conductive layer, and the process may include applying between the light-transmissive electrically-conductive layer and the second electrically-conductive layer a voltage sufficient to change the optical state of the electro-optic medium. The process may include placing a deformable electrically-conductive material on the contact pad of the backplane before laminating the front assembly to the backplane, so that the electrically-conductive layer in the connection area is connected to the contact pad via the deformable electrically-conductive material.

In this process of the present invention, the front assembly may have a layer of transparent adhesive on the opposed side of the electrically-conductive layer from the electro-optic medium, and a release sheet disposed adjacent the layer of transparent adhesive, and the process may include removing the release sheet from the layer of transparent adhesive and laminating the layer of transparent adhesive to a protective and/or barrier layer. Typically, the removal of the release sheet and the lamination of the layer of transparent adhesive will be effected after lamination of the front assembly to the backplane.

In this process of the invention, after lamination of the front assembly to the backplane, a sealing material may be placed around at least part of the periphery of the front assembly. When the display is provided with a protective and/or barrier layer as previously described, this protective and/or barrier layer may extend beyond the periphery of the electro-optic medium, and the sealing material may placed around at least part of the periphery of the electro-optic medium between the protective and/or barrier layer and the backplane.

In another aspect, this invention provides a (sealed) electro-optic display comprising a backplane comprising at least one pixel electrode; a layer of a solid electro-optic medium disposed adjacent the pixel electrode; a light-transmissive electrode disposed on the opposed side of the electro-optic medium from the backplane; a protective and/or barrier layer disposed on the opposed side of the light-transmissive electrode from the electro-optic medium; and a sealing material for preventing ingress of material from the environment into the electro-optic medium, the sealing material being disposed along at least part of the periphery of the layer of electro-optic medium and extending from the backplane to the protective and/or barrier layer.

In such a sealed electro-optic display, the sealing material may have a lateral thickness, measured parallel to the plane of the backplane, which decreases from the backplane to the protective and/or barrier layer. Alternatively, the protective and/or barrier layer may be smaller than the layer of electro-optic medium, measured parallel to the plane of the backplane, and the sealing material may extend over a peripheral portion of the layer of electro-optic medium and contact the periphery of the protective and/or barrier layer. In a further variant of the sealed electro-optic display of the present invention, the protective and/or barrier layer may be larger than the layer of electro-optic medium, measured parallel to the plane of the backplane, and the sealing material extend between the backplane and the peripheral portion of the protective and/or barrier layer extending beyond the periphery of the layer of electro-optic medium.

This invention also provides a second (sealed) electro-optic display comprising a backplane comprising at least one pixel electrode; a layer of a solid electro-optic medium disposed adjacent the pixel electrode; a light-transmissive electrode disposed on the opposed side of the electro-optic medium from the backplane; an electrode support disposed on the opposed side of the light-transmissive electrode from the electro-optic medium, the light-transmissive electrode and electrode support being larger than the layer of electro-optic medium, measured parallel to the plane of the backplane; and a sealing material for preventing ingress of material from the environment into the electro-optic medium, the sealing material extending between the backplane and the peripheral portion of the light-transmissive electrode extending beyond the periphery of the layer of electro-optic medium.

Finally, this invention provides two methods for testing a solid electro-optic medium. The first method comprises:
providing an article of manufacture comprising, in order:
a light-transmissive electrically-conductive layer;
a layer of a solid electro-optic medium in electrical contact with the electrically-conductive layer;
an adhesive layer; and
a release sheet having a second electrically-conductive layer;
applying a potential difference between the two electrically-conductive layers, thereby forming an image on the medium; and
observing the image thus formed.

The second testing method of the invention comprises:
providing an article of manufacture comprising, in order:
a light-transmissive electrically-conductive layer;
a layer of a solid electro-optic medium in electrical contact with the electrically-conductive layer;
an adhesive layer; and
a release sheet;
placing a electrostatic charge on the release sheet, thereby forming an image on the medium; and
observing the image thus formed.

BRIEF DESCRIPTION OF DRAWINGS

Preferred embodiments of the present invention will now be described, though by way of illustration only, with reference to the accompanying drawings, in which.

DETAILED DESCRIPTION

Figure 1:
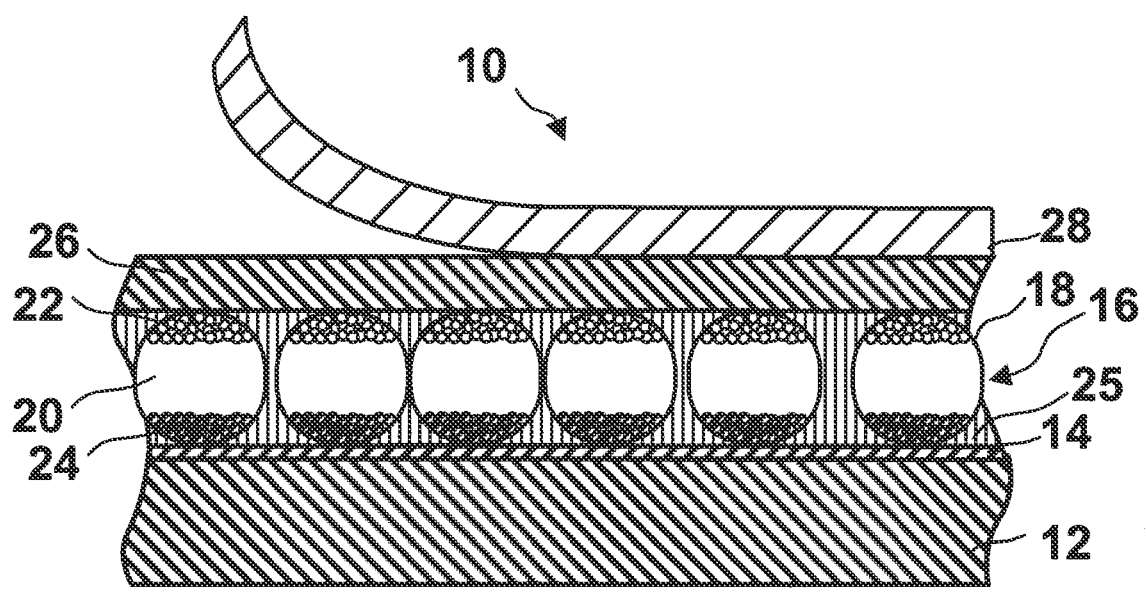
FIG. 1 is a schematic cross-section through a front plane laminate of the present invention showing the manner in which the release sheet is peeled from the laminate prior to incorporation of the laminate into a display.

As already mentioned, the present invention provides an article of manufacture (hereinafter referred to for convenience as a "front plane laminate" or "FPL") comprising, in order: a light-transmissive electrically-conductive layer; a layer of a solid electro-optic medium in electrical contact with the electrically-conductive layer; an adhesive layer; and a release sheet.

The light-transmissive electrically-conductive layer of the front plane laminate serves the dual purpose of forming the front electrode of the display which is eventually formed from the front plane laminate, and of providing mechanical integrity to the front plane laminate, thereby permitting the front plane laminate to be handled in a manner which would or might not be possible with a structure comprising only the electro-optic medium and the adhesive layers. In principle, the electrically-conductive layer may be a single layer, provided that this single layer has the necessary electrical conductivity and mechanical properties; for example, the electrically-conductive layer could comprise a relatively thick (about 100-175 μm) layer of a conductive polymer. However, it is difficult to find a material with the necessary combination of electrical and mechanical properties, and no films suitable for use as such a single electrically-conductive layer appear to be available commercially. Accordingly, at present the preferred form of electrically-conductive layer in fact comprises two layers, namely a thin light-transmissive conductive layer, which provides the necessary electrical conductivity, and a light-transmissive substrate, which provides the mechanical integrity. The light-transmissive substrate is preferably flexible, in the sense that the substrate can be manually wrapped around a drum (say) 10 inches (254 mm) in diameter without permanent deformation. The term "light-transmissive" is used herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 μm), preferably about 2 to about 10 mil (51 to 254 μm). The electrically-conductive layer is conveniently a thin layer of, for example, aluminum or indium-tin-oxide (ITO), or may be a conductive polymer. Polyethylene terephthalate (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the present invention, either as the electrically-conductive layer or (with an appropriate coating) as a release sheet bearing the second electrically-conductive layer.

In a variant of the present invention, a self-supporting solid electro-optic medium can be prepared starting with a release sheet. A layer of the electro-optic medium is formed, by coating, printing or otherwise, on the release sheet, and thereafter an adhesive layer is formed over the electro-optic medium (i.e., on the opposed side of the electro-optic medium from the release sheet). The combined electro-optic medium and adhesive layer can then be used to apply the electro-optic medium to any desired substrate, which could a three-dimensional object. If desired, a second layer of adhesive could be applied on the opposed side of the electro-optic medium from the layer first applied, thereby converting the electro-optic medium into a double-sided adhesive film which could be laminated, for example, to a backplane on one side and to an electrode on the other.

In a presently preferred form of this variant of the invention, a monolayer of capsules of an encapsulated particle-based electrophoretic medium prepared substantially as described in the aforementioned 2002/0185378 (see also the corresponding International Application PCT/US02/15337), Example 7 was deposited on a release sheet, dried, and overcoated with an aqueous urethane binder (NeoRez R-9320, available from NeoResins, 730 Main Street, Wilmington Mass. 01887), which served to planarize the layer of capsules and form an adhesive layer. After drying the adhesive layer, the combined capsule layer and adhesive layer could be peeled away from the substrate as a self-supporting film.

The front plane laminate of the present invention is well adapted for mass production. For example, a roll of a commercial metallized plastic film may be converted to the front plane laminate by a roll-to-roll coating process using conventional commercial coating equipment. The metallized plastic film is first coated with a slurry of capsules in binder, as described in application Ser. No. 10/063,803 (now U.S. Pat. No. 6,822,782), and this capsule layer is dried. A layer of adhesive, for example the aforementioned aqueous urethane resin NeoRez R-9320, is then coated over the capsule layer and dried. The release sheet is then applied over the adhesive, and the combined front plane laminate can then be formed into rolls ready for storage and/or transportation. When it is desired to use the front plane laminate in the construction of displays, the laminate can be unrolled and cut into pieces of the size required for individual displays or groups of displays (in some cases, it may be convenient to laminate multiple displays in a single operation and then separate individual displays at a later stage) using conventional commercial apparatus.

The release sheet used in the front plane laminate of the present invention can be of any known type, provided of course that it does not contain materials which might adversely affect the properties of the electro-optic medium, and numerous suitable types of release sheet will be known to those skilled in the art. Typical release sheets comprise a substrate such as paper or a plastic film coated with a low surface energy material, for example a silicone.

When the front plane laminate of the present invention is used in a display, it is of course necessary to make electrical contact with the conductive layer within the laminate, and this it is usually necessary to provide at least one area (hereinafter called the "connection area") of the display where the conductive layer is free from the electro-optic medium; note that the contact area may be coated with an adhesive to secure the connection area to an appropriate conductor in the final display, and the adhesive used in the connection area may or may not be the same adhesive used in the remaining areas of the display where the electro-optic medium is present. Although the presence of this adhesive does introduce additional electrical resistance, the currents required by most electro-optic media are so low that the additional resistance is not a problem, and if necessary conductive adhesives containing conductive particles or fibers of types well known in the art can be used to lower the resistance introduced by the adhesive in the connection area. Alternatively, as described in more detail below, a deformable conductive material may be used to secure the connection area to the backplane.

A connection area can be provided in two different ways. Firstly, as described below with reference to FIGS. 21 and 22, the formation of the layer of electro-optic medium can be controlled so as to leave uncoated areas ("gutters") where no electro-optic medium is present, and portions of these uncoated areas can later serve as the connection areas. Alternatively, the whole surface of the laminate can be covered with the electro-optic medium and this medium later removed from the connection area in any convenient manner, for example by mechanical abrasion or chemical degradation of the electro-optic medium. In some cases, after removal of the electro-optic medium from the connection area, the laminate may need cleaning to remove residue from the electro-optic medium; for example, if the electro-optic medium is an encapsulated electrophoretic medium, it is desirable to remove any internal phase remaining after rupture of the capsules during removal of the electrophoretic medium from the connection area.

One important advantage of the front plane laminate of the present invention is the ability to test the quality of the laminate before its incorporation into a final display. As is well known to those skilled in coating technology, coated materials of often display imperfections such as voids, streaks, variation in thickness of coated layers, point delamination and other problems which can adversely affect the performance of the coated material or even render it unusable. Encapsulated electro-optic media also suffer from defects due to bursting of the capsules during coating. Thus, it is usually necessary to inspect a coated product, either by eye or by a machine vision system, to identify any defects before using it in a final product. This is especially necessary with electro-optic media intended for use in active matrix displays, since in practice the cost of the active matrix backplane of such a display is much greater than the combined cost of the electro-optic medium and front electrode structure; if a defective coating of electro-optic medium is laminated to a backplane, both the medium and the backplane must be scrapped since there is normally no way of removing the medium while preserving the backplane.

Unfortunately, the inspection of electro-optic media presents peculiar difficulties as compared with other coated materials. An electro-optic medium only undergoes its crucial change in optical state when subjected to an electric field, and several types of coating defects (for example, inclusions or impurities in the adhesive layer or burst capsules) which adversely affect the ability of the medium to undergo its change in optical state are very difficult to observe visually. Thus, it is desirable to be able to apply an electric field to the medium during testing. However, in most prior art processes this is not possible. Typically, in such prior art processes, a backplane and a front electrode structure are formed separately, a layer of electro-optic medium is provided on one of these components (usually the front electrode structure) and the backplane and front electrode structure are laminated together with the electro-optic medium sandwiched between them. Such a process does not provide any point before the lamination at which the electro-optic medium can be switched between its optical states, and thus defects in the electro-optic medium or the adhesive may not be discovered until after the formation of the final display, with resultant costly scrapping of good backplanes which happen to be laminated to defective electro-optic medium or adhesive. (Note that in most cases, it is not possible to test an electro-optic medium adequately by simply pressing it mechanically against an electrode, since surface irregularities on the medium or the electrode usually render it impossible to produce a uniform change in the optical state of the medium, and such a uniform change in optical state is required for thorough testing of the medium.)

As already indicated the present invention provides methods for testing the electro-optic medium and other components of the laminate prior to final attachment of the laminate to a backplane.

A basic front plane laminate of the present invention, and a process for the testing thereof will now be described with reference to FIGS. 1 and 2.

FIG. 1 is a schematic cross-section through a basic front plane laminate of the present invention showing the manner in which the release sheet is peeled from the laminate prior to incorporation of the laminate into a display. As shown in FIG. 1, the laminate (generally designated 10) comprises a light transmissive substrate 12, which has the form of a transparent plastic film, conveniently a 7 mil (177 mm) PET sheet. Although not shown in FIG. 1, the substrate 12, the lower surface of which (as illustrated in FIG. 1) forms the viewing surface of the final display, may have one or more additional layers, for example a protective layer to absorb ultra-violet radiation, barrier layers to prevent ingress of oxygen or moisture into the final display, and anti-reflection coatings to improve the optical properties of the final display. The substrate 12 carries a thin light-transmissive electrically-conductive layer 14, preferably of ITO, which acts as the front electrode in the final display.

A layer (generally designated 16) of an electro-optic medium is deposited upon, and in electrical contact with, the conductive layer 14. The electro-optic medium shown in FIG. 1 is an opposite charge dual particle encapsulated electrophoretic medium of the type described in the aforementioned 2002/0185378, and comprises a plurality of microcapsules, each of which comprises a capsule wall 18 containing a hydrocarbon-based liquid 20 in which are suspended negatively charged white particles 22 and positively charged black particles 24. The microcapsules are retained within a binder 25. Upon application of an electrical field across the layer 16, the white particles 22 move to the positive electrode and the black particles 24 move to the negative electrode, so that the layer 16 appears, to an observer viewing the display through the substrate 12, white or black depending upon whether the layer 14 is positive or negative relative to the backplane at any point within the final display.

The laminate 10 further comprises a layer 26 of lamination adhesive coated over the electro-optic medium layer 16 and a release layer 28 covering the adhesive layer 26. The release layer is conveniently a 7 mil (177 mm) PET film, which may be provided with any appropriate release coating, for example a silicone coating. As illustrated at the left side of FIG. 1, the release layer 28 is peeled from the adhesive layer 26 before the laminate is laminated, by means of the adhesive layer 26, to a backplane to form the final display.

Figure 2:
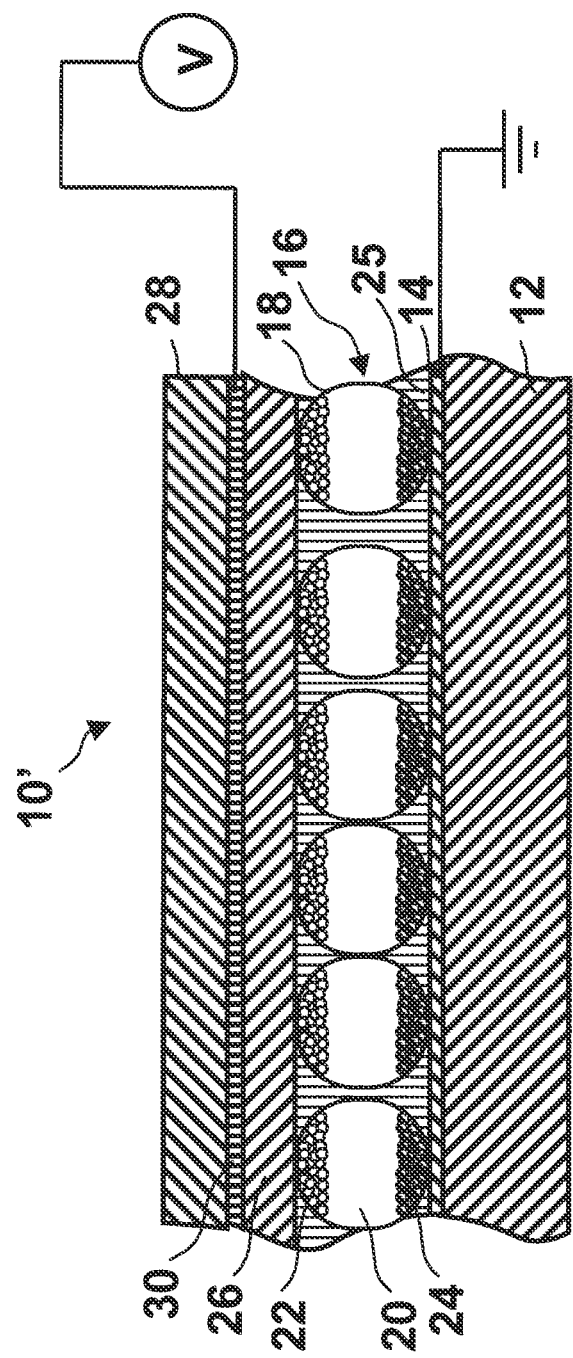
FIG. 2 is a schematic cross-section, similar to that of FIG. 1, through a second front plane laminate of the present invention undergoing testing.

FIG. 2 shows a modified front plane laminate (generally designated 10') which is identical to the laminate 10 shown in FIG. 1, except that a thin second conductive layer 30, preferably of aluminum, is provided on the surface of the release layer 28 facing the electrophoretic medium. (The second conductive layer 30 could alternatively be provided on the surface of the release layer remote from the electrophoretic medium. However, the arrangement shown in FIG.

2 is generally preferred, since, as described below, the second conductive layer 30 is used for testing of the electrophoretic medium, and, to produce as large an electric field as possible across this medium for any given operating voltage, it is desirable to keep the distance between the two conductive layers as small as possible.) As already indicated, the release layer 28 and conductive layer 30 can be formed from an aluminized PET film, and such films are readily available commercially. Although not shown in FIG. 2, in some cases, depending upon the properties of the electro-optic medium, it may be necessary or desirable to provide a coating of a low surface energy material, such as a silicone, over the second conductive layer 30 to prevent this layer sticking to the electro-optic medium. Although this low energy material introduces an additional electrical resistance into the system, the resistance of most electro-optic media is sufficiently high that the presence of the additional resistance is not a problem. If necessary, the driving voltage used during testing (see below) may be adjusted to allow for the additional resistance.

FIG. 2 shows the laminate 10' being tested, with the conductive layer 14 grounded and a drive voltage V, sufficient to cause a change in the optical state of the electro-optic medium and preferably equal to the drive voltage used in the final display, applied to the second conductive layer 30. Contact with the second conductive layer 30 may be achieved by peeling a small area of the release layer 28 away from the adhesive layer 26; contact with the conductive layer 14 may be achieved by similar peeling and either removing the electro-optic medium from a small area of the laminate or by piercing this medium with, for example, crocodile clips. Advantageously, an alternating, preferably square wave, voltage is applied to the second conductive layer 30, so that the entire sheet of laminate 10' flashes black and white. The human eye is very sensitive to even small areas which do not flash in this situation, so that even small defects are readily observable. Furthermore, since the testing method can readily be applied to large sheets of the laminate, in many cases small defects can be marked and subsequent cutting of the large sheet into portions needed for individual displays can be adjusted, thus enabling the maximum number of individual displays to be obtained from a sheet with some defects.

The testing method shown in FIG. 2 allows inspection to be achieved with precise application of a low voltage corresponding to the drive voltage used in the actual display, thus essentially guaranteeing that the properties of the laminate displayed during testing will correspond to those achieved in the final display. For example, an area of the electro-optic medium which does undergo a change of optical state, but more slowly than required by the design specification, can readily be detected by this method. The method does not require high voltage sources, which can be hazardous in certain environments, leaves essentially no residual electrostatic charges on the laminate, and is well adapted for automated inspection.

Figure 3:
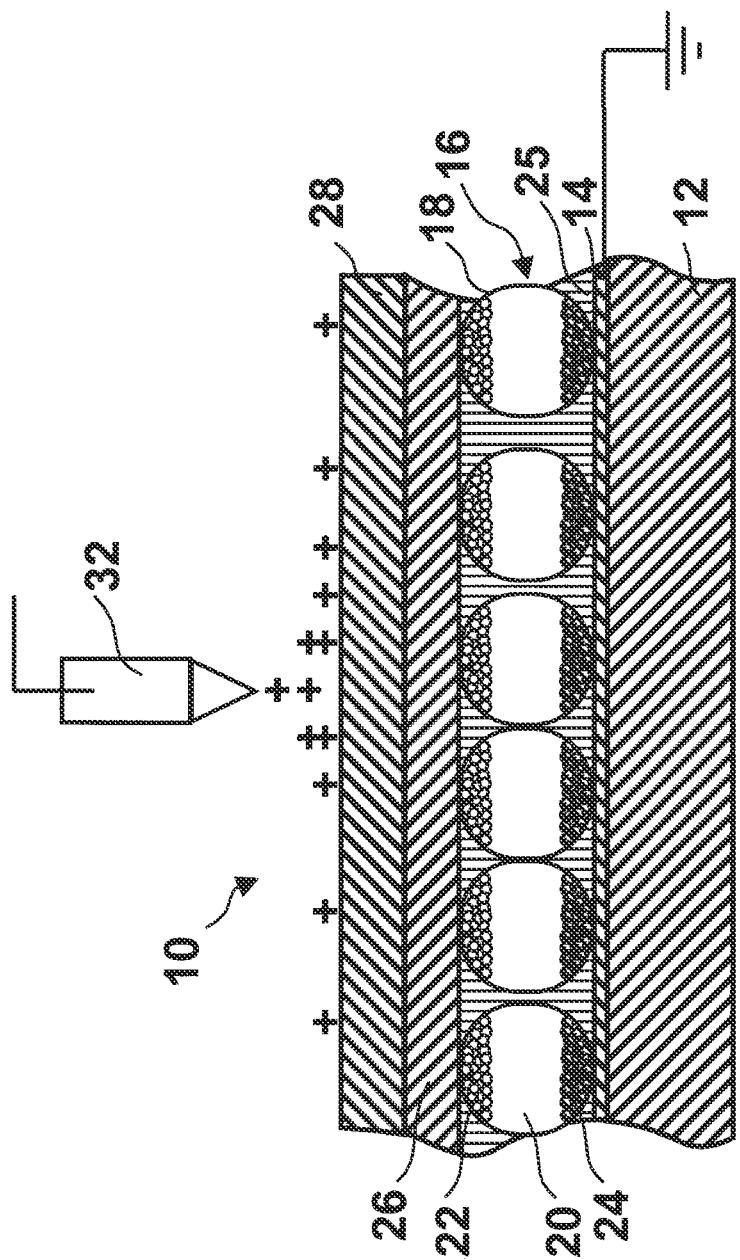
FIG. 3 is a schematic cross-section, similar to that of FIG. 1, showing the front plane laminate of FIG. 1 undergoing testing.

A preferred embodiment of a second testing method of the invention is illustrated schematically in FIG. 3, which shows the second testing method being applied to the laminate 10 shown in FIG. 1. As shown in FIG. 3, the conductive layer 14 is grounded in the same way as in FIG. 2. An electrostatic head 32 is disposed near the release layer 28, thereby distributing electrostatic charge on the exposed surface of the release layer 28; although positive charges are shown in FIG. 3, negative charges could of course be used and indeed, for reasons similar to those already discussed, it is advantageous to apply charges of opposite polarities in successive steps of the testing process. The electrostatic charge placed on the release layer 28 causes the optical state of the laminate 10 to change.

Figure 4:
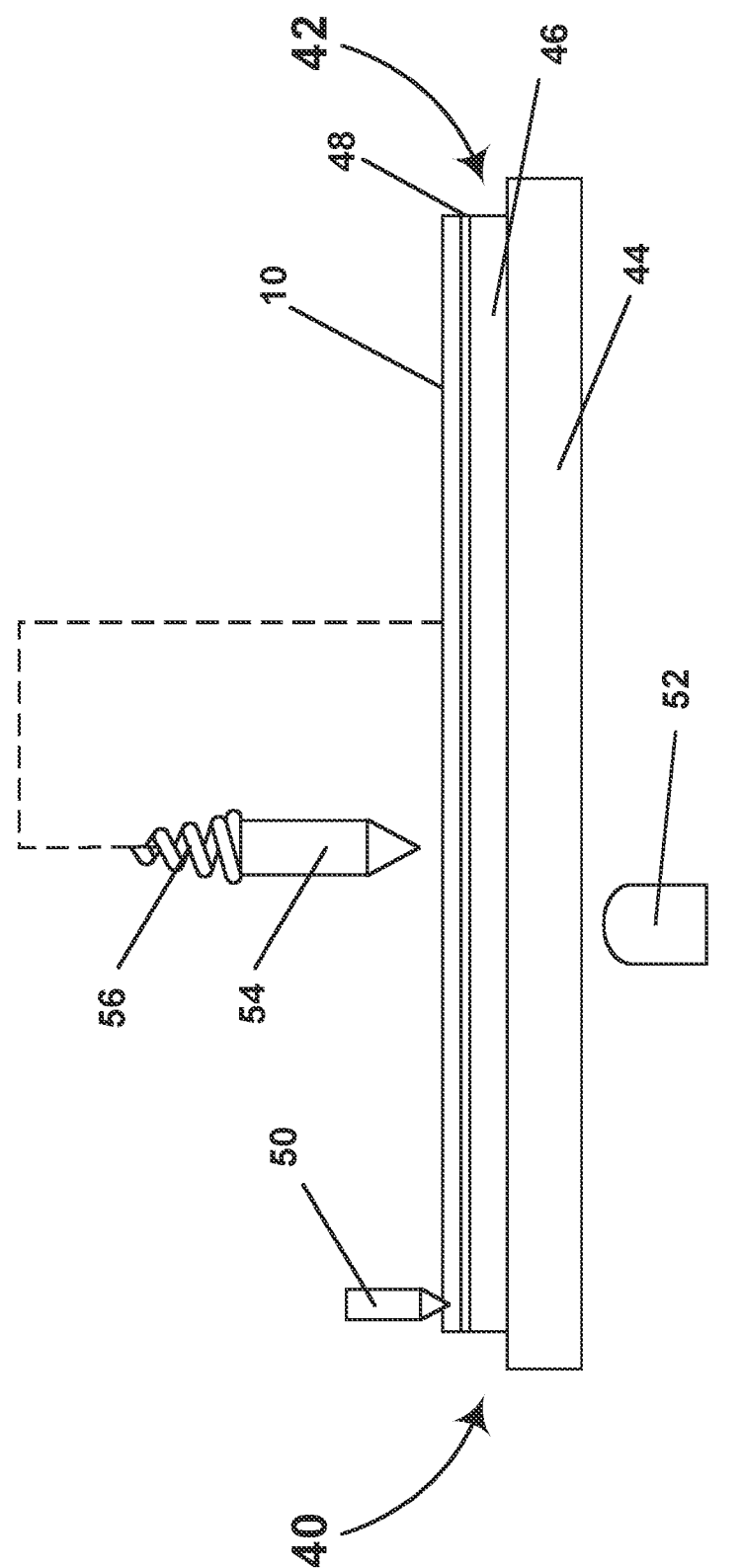
FIG. 4 is a schematic side elevation of an apparatus for carrying out the testing method shown in FIG. 3.

FIG. 4 is a more detailed, though still schematic, side elevation of a preferred apparatus (generally designated 40) for carrying out the testing method of FIG. 3. This apparatus 40 includes a "transparent electrostatic chuck" (generally designated 42) which is used to hold the laminate 10 in position for testing. (An electrostatic chuck is preferred over mechanical clips because an electrostatic chuck ensures that the laminate is absolutely flat against the glass support, thus eliminating reflective artifacts in the image seen.) The chuck 42 comprises a flat glass plate 44 to which is bonded with optical cement a plastic film 46 (conveniently of PET), the exposed surface of which carries an ITO layer 48. A solenoid-actuated pogo pin 50 mounted on the chuck 42 contacts the conductive layer 14 (see FIG. 1) of the laminate 10, and a voltage is applied between the conductive layers 14 and 48 to produce between these layers an electrostatic attraction which holds the laminate 10 firmly in position on the chuck 42 during testing.

A line scan camera 52 is mounted below the chuck 42 so that it can scan the laminate 10 through the chuck. An ionographic print head 54 is mounted above the chuck 42 to apply electrostatic charge to the release layer 28 (FIG. 1) of the laminate 10 in the manner illustrated in FIG. 3. Suitable ionographic print heads, of the type described in U.S. Pat. No. 4,160,257, are available commercially; one experimental apparatus used a head recycled from a Xerox Docuprint 1300 Electron Beam printer, sold commercially by Xerox Corporation, Stamford Conn. The print head 54 is provided with a spring-loaded slide mechanism 56 (illustrated in a highly schematic manner in FIG. 4) which maintains the print head 54 at a constant distance, typically about 0.5 mm, from the exposed surface of the release layer 28. The camera 52 and print head 54 are attached to a common linear motion stage (not shown) and during testing of the laminate 10 move from left to right in FIG. 4, the camera 52 being positioned a short distance "downstream" from the print head 54 so that the linear area scanned by the camera 52 is an area which has recently been imaged by the print head 54.

The preferred mode of operation of the apparatus shown in FIG. 4 is as follows. An operator places the laminate sheet 10 on to the electrostatic chuck 42. The operator ensures that the sheet is properly aligned using registration pins or printed registration marks (not shown). After the operator closes a safety interlock cover (not shown), the pin 50 makes electrical contact with the conductive layer 14. The apparatus then activates the chuck 42, thus causing an electric field between the two conductive layers 14 and 48 and pulling them together.

The ionographic print head 54 drives the electrophoretic medium to an optically saturated optical state by projecting a beam of ions onto the release layer 28. The ions cause the formation of an equal and opposite image charge on the conductive layer 14, and the resultant electric field changes the color on the viewing surface (the lower surface in FIG. 4) of the laminate 10. Over time, the energy stored in the electric field across the electrophoretic medium dissipates by electrical conduction.

The line scan camera 52 images the laminate 10 through the electrostatic chuck 42. The apparatus is designed to provide precise, even illumination to the laminate being imaged by the camera. A controller (not shown) controls the various components of the machine (camera, stage, light, etc.) and processes images from the camera 52 to decide if the laminate sheet being measured is within manufacturing specifications. Since it is necessary to detect areas which fail to change optical state in either direction (i.e., white areas that fail to turn black or black areas that fail to turn white), at least two scans of the laminate 10 are required for full testing, with the polarity of the print head 54 being reversed between scans. The controller may use a simple thresholding algorithm to determine location of defects: pixels of the image that fall outside of an upper and/or lower reflectivity bound for each optical state tested are considered defects. The computer may then perform more sophisticated processing on the resultant pixel defect data to determine whether the laminate meets specifications. For example, a group of contiguous defect pixels might be called a single defect. The computer could count the number of pixel defects per area, location of each defect, average defect area, and any number of other computed parameters.

The apparatus can then indicate if the sheet is accepted or rejected. If the sheet is rejected, the apparatus can generate a numerical control program for a laser cutter to dice the laminate sheet under test into smaller sheets that meet specifications. Alternatively, rejected sheets could be discarded.

It should be noted that the voltages which need to be applied to the print head 54 in such an apparatus are much less than might be thought from a naïve analysis of the resistance of a typical release layer as compared with that of an electro-optic medium, and, as already indicated, the print head voltage required in practice is well within the capability of commercial ionographic print heads. For example, in one experiment the apparatus illustrated in FIG. 4 was used to test encapsulated electrophoretic media which, in the final displays, were to be switched between their black and white states using 15V driving pulses having durations of 150 to 500 msec. In the laminates, the release layer used was a PET film having a resistance of $10^{13}$ ohm $cm^2$. Considering only the resistance of the electrophoretic medium (about $10^8$ ohm $cm^2$) versus the resistance of the release layer one might conclude that driving the ink through the release layer would require over 1 million volts. However, the capacitance of the layers was about the same (28 $pF/cm^2$ for the electrophoretic medium and 50 $pF/cm^2$ for the release layer) so in practice, pulses of less than 1000 V across the electrophoretic medium and release layer combined caused resistance-capacitance spikes across the electrophoretic medium that carried sufficient energy for full transitions between the optical states thereof.

In experiments using an electrophoretic medium as discussed above with a 0.05 mm (2 μm) release layer and the aforementioned Xerox print head, full transitions between black and white states were successfully demonstrated at a tracking speed of 10 mm/sec. using a driver electrode voltage of 1900 VPP, a driver electrode frequency of 50 KHz, a driver pulse width of 30 Hz, and spacing of 0.5 mm between the print head and the release layer. To drive the medium to its white optical state, the control electrode voltage was set to 0 V, the screen electrode voltage to 180 V and the accelerating voltage to +1000 V. To drive the medium to its black optical state, the control electrode voltage was set to 200 V, the screen electrode voltage to 20 V and the accelerating voltage to −1000 V. All voltages given are with respect to a common ground.

Figure 5:
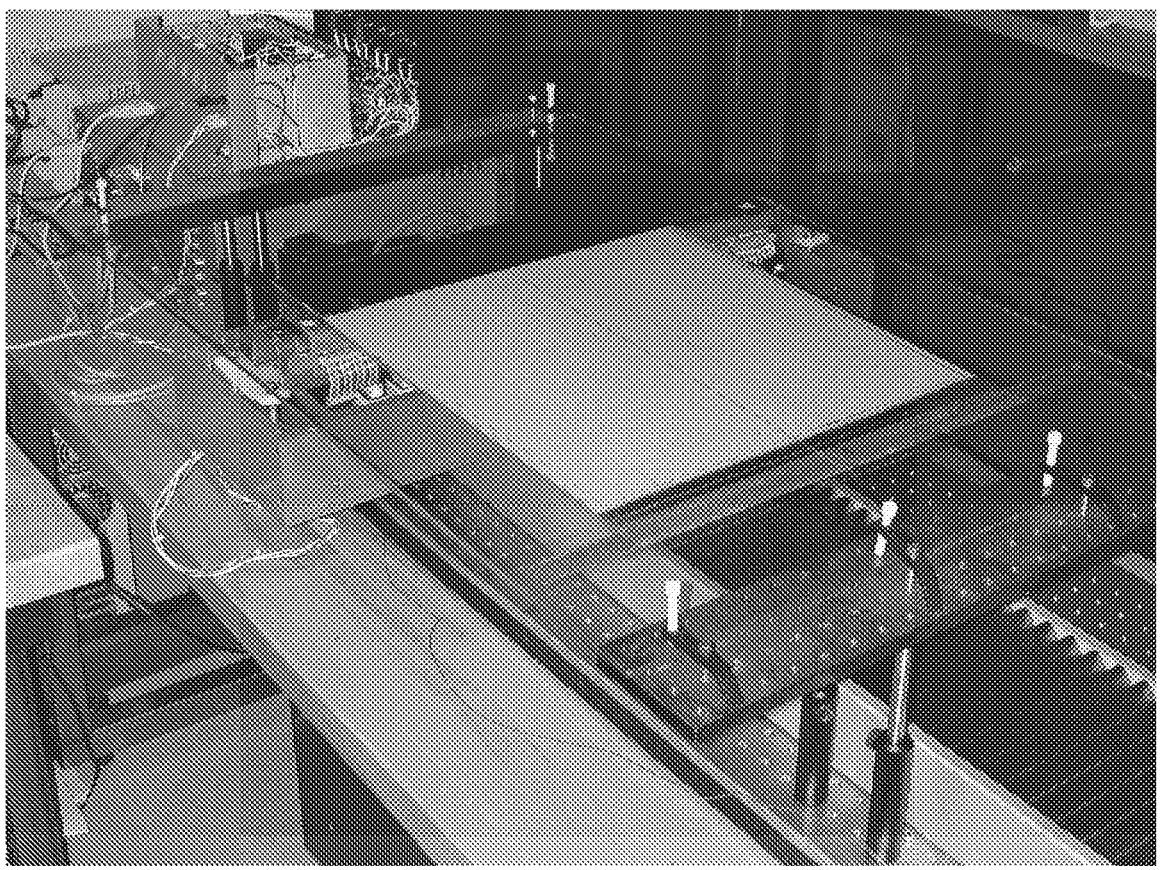
FIGS. 5, 6 and 7 show three views of a practical form of the apparatus shown schematically in FIG. 4.
Figure 6:
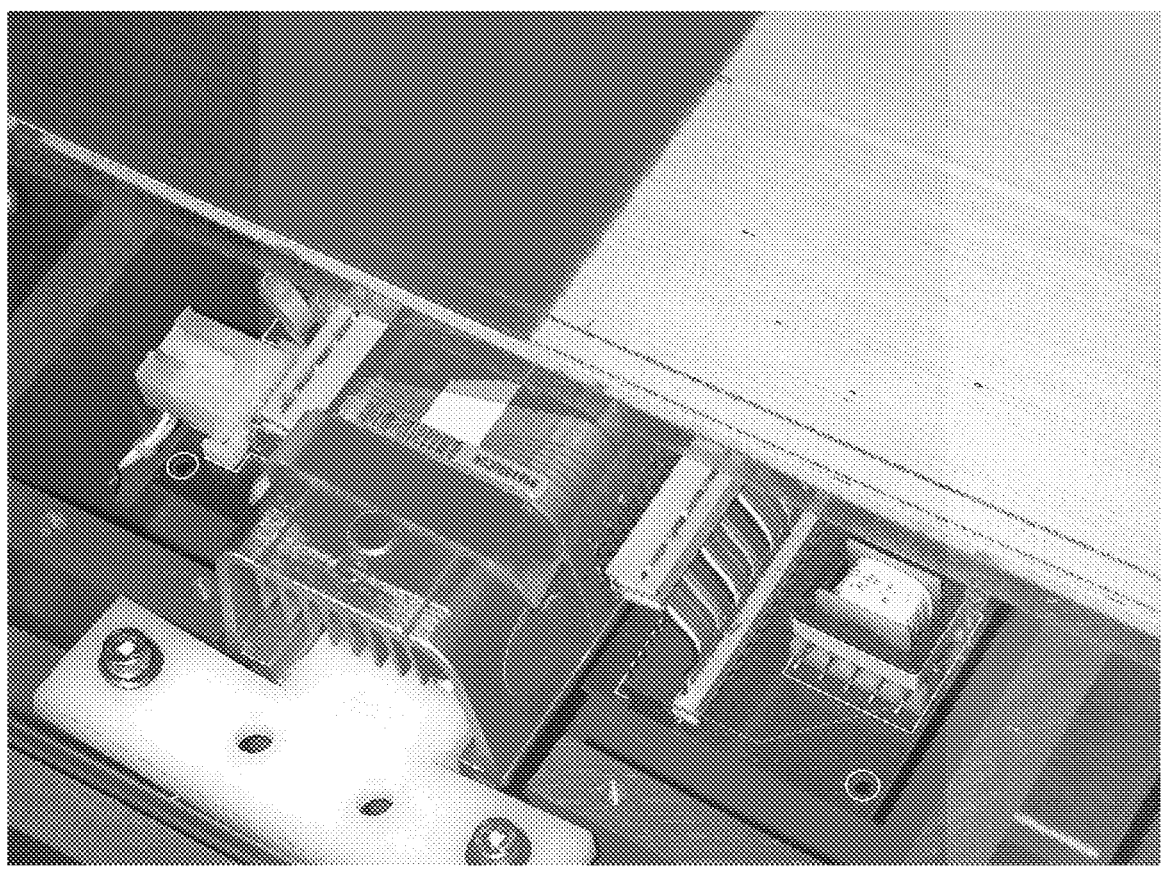
Figure 7:
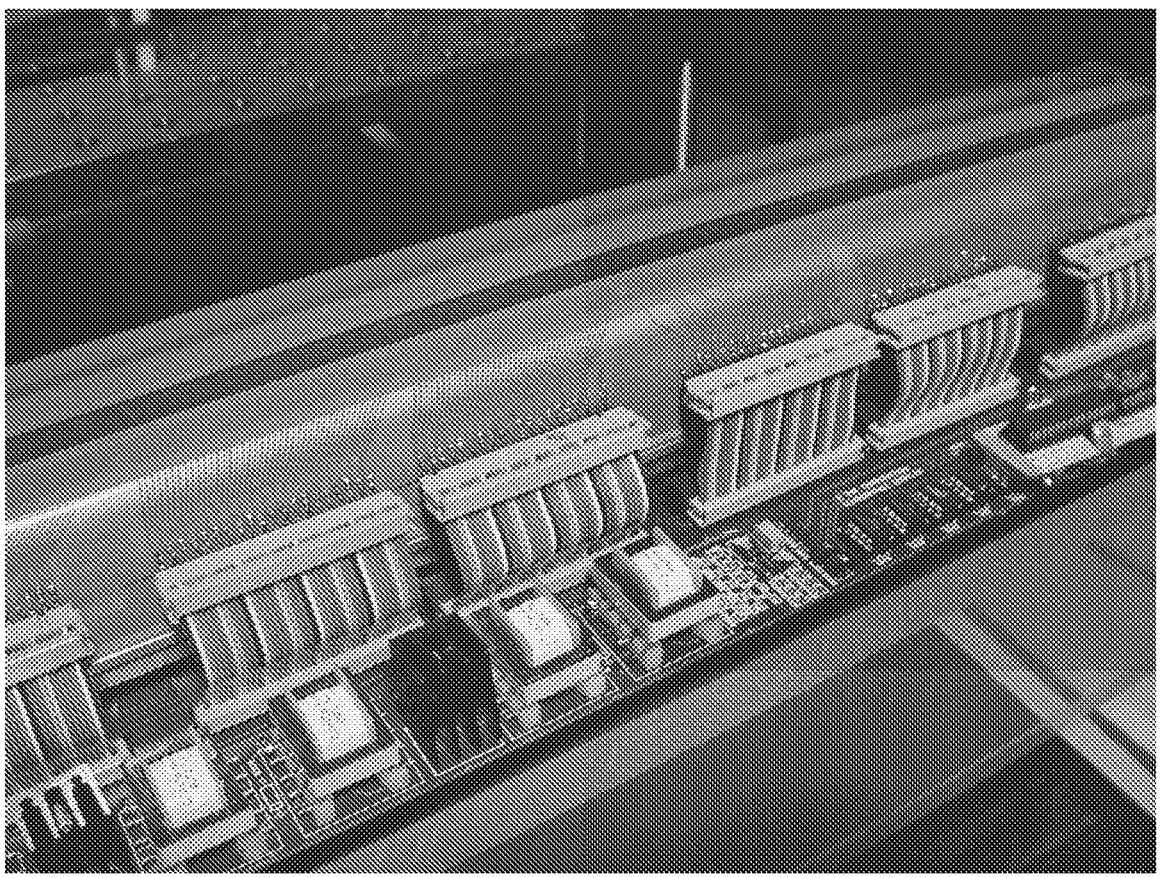

FIGS. 5, 6 and 7 are photographs showing the actual apparatus used in these experiments. FIG. 5 shows the overall test set up, FIG. 6 shows the print head switching the electrophoretic medium from white to black, and FIG. 7 shows the ionographic print head and its associated control board.

This test method of the present invention has been shown to achieve full optical state transitions and provides a non-contact testing methods which carries no risk of bursting capsules in encapsulated electro-optic media and can achieve a high testing speed.

Figure 8:
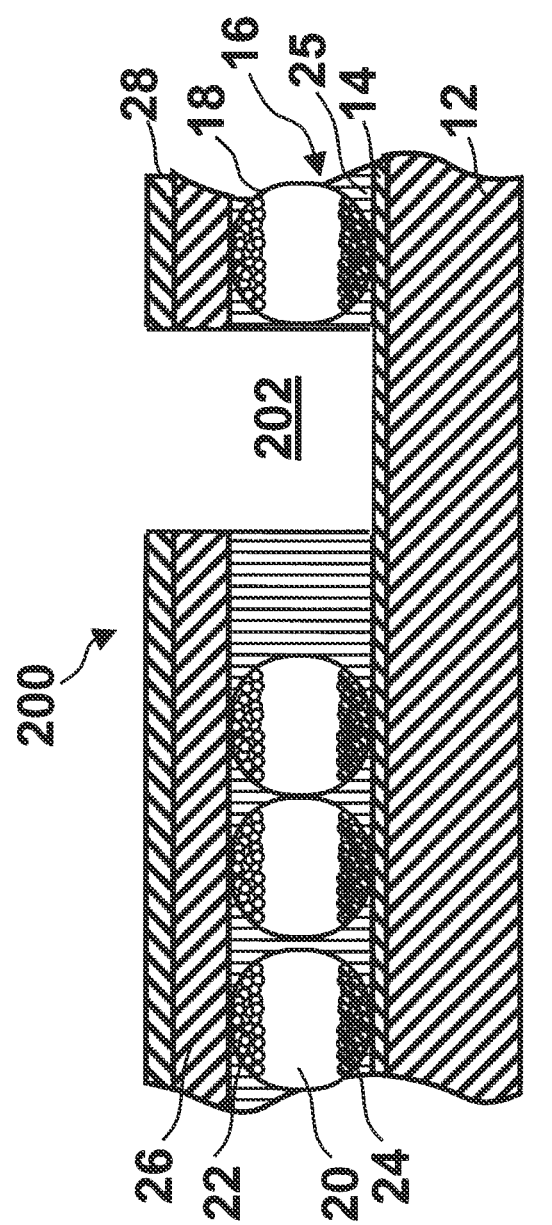
FIG. 8 is a schematic cross-section, similar to that of FIG. 1, through a third front plane laminate of the invention.

FIG. 8 shows a laminate (generally designated 200) which closely resembles the laminate 10 shown in FIG. 1, but which is provided with a connection area having the form of an aperture 202 extending through the release sheet 28, the adhesive layer 26 and the electro-optic medium layer 16, thus exposing an area of the conductive layer 14 lying at the base of the aperture 202. The aperture 202 may be formed by any conventional technique, including for example depth routing techniques. The formation of the aperture 202 may be performed in two stages, the first of which removes the release sheet 28 and the second of which removes the adhesive layer 26 and the electro-optic medium layer 16. The first stage of the process may be carried out by physically cutting the release sheet 28 using a mechanical cutter provided with a depth control to limit the depth of cut. The severed portion of the release sheet 28 can then be removed, for example by suction from a vacuum device. Alternatively, the release layer could be removed by laser ablation or by dry etching, especially reactive ion etching, which can be performed in a highly controllable and repeatable manner. Etching may also be used to remove the adhesive layer 26 and the electro-optic medium layer 16, preferably using an etching technique for which the conductive layer 14 acts as an etch stop. However, the presently preferred technique for removing the adhesive layer 26 and the electro-optic medium layer 16 is wet mechanical rubbing; this technique may also be used to remove the release sheet 28. Such mechanical rubbing is preferably effected using a non-woven and non-shredding tape, such as polyester rayon, and removes the material by a shearing type action.

The use of high energy material removal techniques, such as laser ablation, is not recommended for removal of the layers 26 and 16 since in practice such high energy techniques tend to damage the conductive layer 14. As already mentioned, the substrate 12 and conductive layer 14 are conveniently formed from an ITO-coated PET film, and such films are available commercially. However, in such commercial films, the thickness of the ITO is only of the order of 100 nm (0.1 μm) and hence the ITO is relatively easily damaged by high energy removal techniques.

To reduce the risk of damage to the conductive layer 14, it may be advantageous to increase the thickness of the layer 14 in the area where the aperture 202 is to be formed; obviously, it is not practical to increase the thickness of the whole conductive layer 14, since this layer lies between an observer and the electro-optic medium layer 16 when a display is in use, and increasing the thickness of the whole layer 14 would adversely affect the optical properties of the display. However, the aperture 202 will typically be formed in a peripheral area of the display, normally an area which is not visible in use, for example by being hidden under the bezel of the display, and hence the thickness of the layer 14 can be increased in such an area without affecting the optical performance of the display. The thickness of the conductive layer 14 in the area which will eventually be exposed by aperture 202 may be effected by printing a conductive ink, for example a silver or graphite ink, over the ITO layer; note that in practice the conductive ink is printed over the relevant area of the PET/ITO film (or similar film used to form the substrate 12 and conductive layer 14) before the electro-optic medium layer 16 is coated or otherwise deposited over the conductive layer 14.

Forming an aperture through some electro-optic media may cause the formation of significant amounts of debris. For example, in FIG. 8, a "blank" area from which microcapsules are missing is shown to the left of aperture 202, and this blank area indicates that one microcapsule has disappeared the layer 16 as a result of the formation of aperture 202. (The size of the microcapsules in FIG. 8 is of course greatly exaggerated relative to the size of the aperture; in practice, a typical aperture would have a diameter of the order of about 10 microcapsules.) The "missing" microcapsule was punctured during the formation of aperture 202 and hence formed debris in the aperture. This debris should be removed before the front plane laminate is used in a display, since it may interfere with the necessary electrical contact between the conductive layer 14 and the backplane of the display. Some methods for formation of the aperture 202, for example wet mechanical rubbing, may themselves serve as efficient removers of debris from the electro-optic medium, but if the method used to form to aperture 202 does not itself remove debris, any known debris removal technique, for example plasma etching or washing the aperture with a stream of a liquid or gas, may be used to remove the debris, provided of course that the debris removal technique used does not cause damage to the electro-optic medium which would result in unacceptable adverse effects on the optical performance of the final display.

The aperture 202 is, in the final display, filled with a conductive material and thus forms a conductive path between the front electrode (the conductive layer 14) and the backplane of the display. (Although only one aperture 202 is shown in FIG. 8, in practice it may be advantageous to provide more than one aperture within a portion of the front plane laminate 10 used to form a single display, thus providing multiple conductive paths between the front electrode and the backplane of the display and permitting the display to function correctly even if one conductive path fails to function correctly due to, for example, cracking of a material forming the conductive path.) However, the filling of the aperture 202 with the conductive material may be effected before, or essentially simultaneously with, the lamination of the front plane laminate to the backplane.

Figure 9:
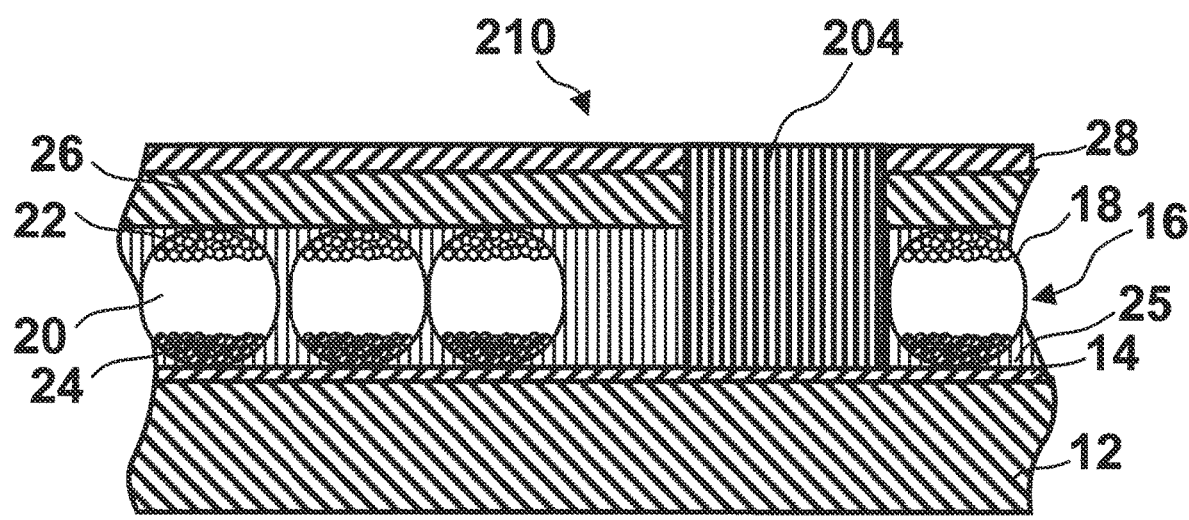
FIG. 9 is a schematic cross-section, similar to those of FIG. 8, through a fourth front plane laminate of the invention.

FIG. 9 illustrates a front plane laminate (generally designated 210) in which the filling of the aperture 202 has effected before lamination. In FIG. 9, the aperture 202 shown in FIG. 8 has been filled with a conductive material to form a conductive via 204 extending from the conductive layer 14 to the exposed surface of the release sheet 28. The via 204 may be formed from any conductive material, though the use of a deformable conductive material, for example a material comprising conductive particles in a polymeric matrix, is convenient. Conductive materials of this type include silver ink, silver-filled epoxy resin, metal-containing silicones and other materials. Alternatively, the via 204 could be formed from a conductive tape. The conductive material may be inserted into the aperture 202 in any convenient manner, for example by printing an ink on to the front plane laminate or by injecting the conductive material through a needle into the aperture 202. It should be noted that the use of a process such as printing, which may leave excess conductive material on the surface of the release sheet 28, is not objectionable since the excess conductive material will be removed with the release sheet 28 prior to lamination of the front plane laminate to the backplane. If the conductive material is of a type which requires curing, partial curing of the conductive material may be effected after insertion of the conductive material into the aperture 202, but final curing of the conductive material is desirably postponed until after lamination of the front plane laminate to the backplane in order that the conductive material may remain somewhat deformable during this lamination and thus make better electrical contact with the backplane. One advantage of using silver-filled epoxy resin to form the conductive via 204 is that that material does not require a residence time for curing prior to lamination; a lamination conducted within a preferred elevated temperature range, as described below, effects curing of the silver-filled epoxy resin during the lamination itself.

The front plane laminate structures shown in FIGS. 8 and 9 will typically be formed while the front plane laminate is still in bulk, web form. Next, the front plane laminate will typically be cut into pieces of the size needed to form individual displays. This cutting may be effected using a laser cutter or a cutting die. It is one of the important advantages of the invention that the front plane laminate can be prepared in the form of a web, which can then be cut into a variety of different size pieces for use with differing displays; thus, the manufacturer of the front plane laminate does not need to keep a large inventory of different sized pieces, but can prepare the front plane laminate as a web and cut this web into pieces of varying sizes as orders are received. Again, it should be noted that cutting of some types of electro-optic media may result in the formation of debris, for example from ruptured capsules of an encapsulated electrophoretic medium, and appropriate cleaning may be required after cutting in order to remove such debris.

The present invention allows flexibility in the order of performing the various steps in the preparation of the front plane laminate. For example, instead of removing the release sheet, adhesive layer and electro-optic medium from parts of a web of front plane laminate (and optionally inserting a conductive material), and then severing the web to form individual pieces of the laminate, the web could be severed first and removal of the various layers effected on the individual pieces of laminate. In this case, it may be desirable to provide a jig or die to hold the pieces of laminate in order to ensure that removal of the release layer, adhesive layer and electro-optic medium is effected from accurately defined areas of the pieces of laminate. Other variations in the order of process steps are of course possible; for example in producing the laminate of FIG. 9, formation of the apertures 202 (FIG. 8) could be effected on a web of laminate, which is thereafter severed to produce individual pieces, and insertion of the conductive material to form the conductive vias could be effected after severing, possibly immediately before lamination of the laminate pieces to backplanes.

The front plane laminates shown in FIGS. 8 and 9 are desirably tested by one of the methods previously described before being integrated into displays as described below with reference to FIGS. 10 to 17.

The next major step in the process for forming an electro-optic display is laminating the front plane laminate to a backplane. However, before the front plane laminates shown in FIGS. 8 and 9 are laminated to a backplane, the release sheet 28 must be removed. This removal may be effected by applying an adhesive tape to the exposed surface of the release sheet and peeling the release sheet from the adhesive layer using the adhesive tape. Alternatively, in some case the release sheet may be arranged to extend beyond the edge of the adhesive layer 26 and the electro-optic medium layer 16 (for example by using a release sheet web which is wider than the applied adhesive layer 26), leaving one or more "tabs" of release sheet which can be grasped manually and pulled to remove the release sheet. Removing the release sheet 28 exposes the adhesive layer 26 ready for the lamination process.

Figure 10:
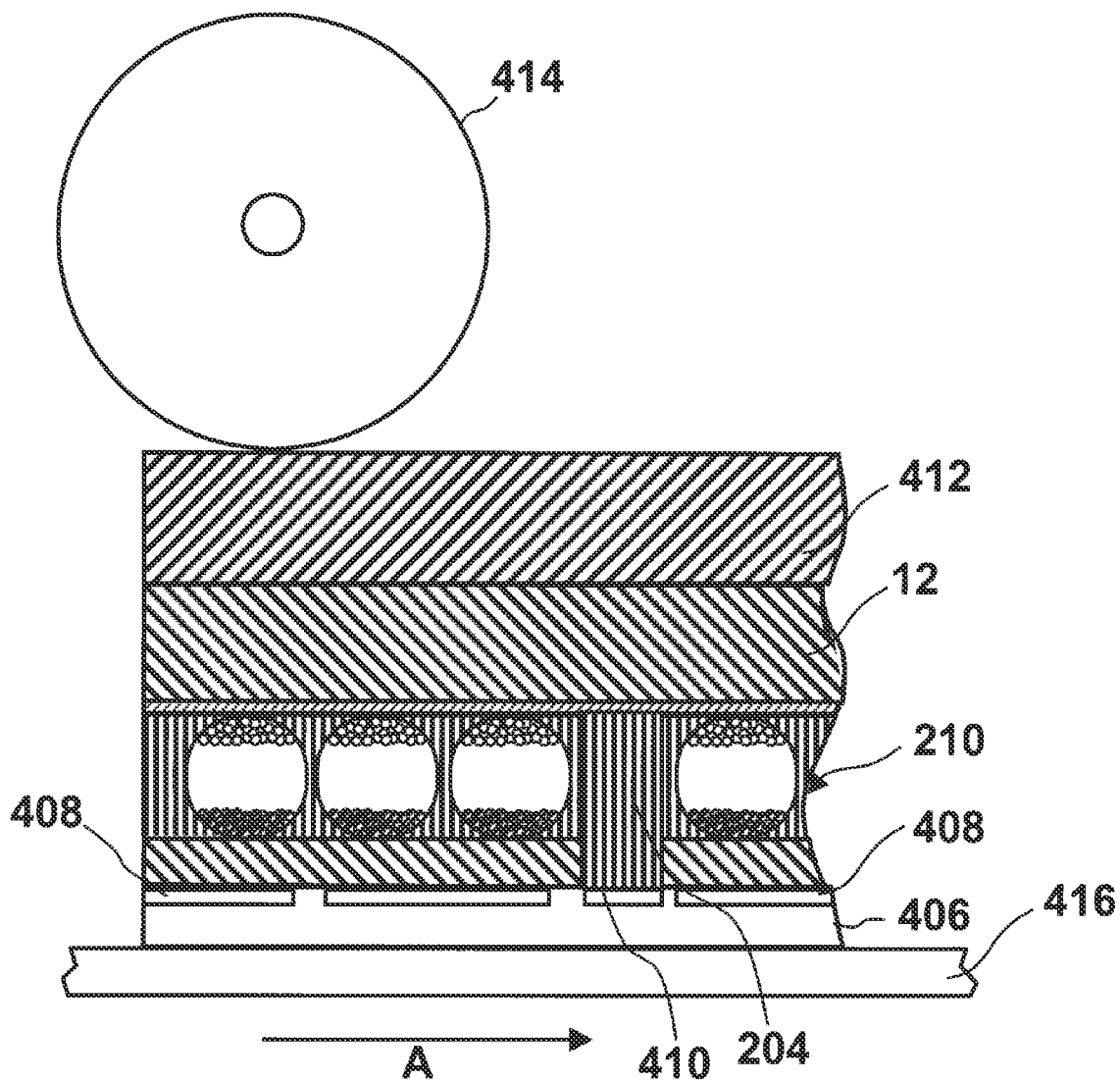
FIG. 10 is a schematic cross-section showing the front plane laminate of FIG. 9 being used in an intermediate stage of a process to form a first electro-optic display of the present invention.

FIG. 10 illustrates schematically the front plane laminate 210 shown in FIG. 9 being laminated to a backplane 406 provided with pixel electrodes 408 and a contact pad 410. FIG. 10 shows a protective layer 412 being laminated over the substrate 12 of the front plane laminate 10 simultaneously with the lamination of the front plane laminate to the backplane 406. Although provision of such a protective layer is desirable for reasons discussed below, the protective layer need not be attached in the same lamination as that used to laminate the front plane laminate to the backplane, and typically the protective layer will be applied in a second lamination after the front plane laminate has been laminated to the backplane. Alternatively, the protective layer 412 could be applied to the substrate 12 before the electro-optic medium 16 is applied to the substrate. It should be noted that the front plane laminate is inverted in FIG. 10 relative to the position in which it is illustrated in FIG. 9.

FIG. 10 shows the lamination being effected using a roller 414 and a moveable heated stage 416 which, during the lamination process, is moved in the direction of arrow A. The backplane 406 is placed on the stage 416, and a cut piece of front plane laminate 210 is placed over the backplane 406, the front plane laminate 210 and the backplane 406 preferably being aligned using pre-positioned alignment reference markers, e.g., edge references, to control alignment in both directions parallel to the plane of stage 416 to achieve precision alignment of the two components prior to lamination. Protective layer 412 may then be placed over front plane laminate 210.

Once aligned, protective layer 412, front plane laminate 210 and backplane 406 are laminated together by advancing stage 416 in the direction of arrow A under roller 414, while the stack of material on stage 416 is held at a specific elevated temperature, desirably in the range of 50-150° C., and preferably in the range of 80-110° C. for hot melt adhesives such as ethylene vinyl acetate. Roller 414 may be heated or un-heated, and applies a pressure desirably in the range of 0.2 to 0.5 MPa and preferably in the range of 0.35 to 0.5 MPa. The lamination adhesive layer is preferably temperature- and pressure-activated, so that the heat and pressure of the lamination laminate front plane laminate 210 and backplane 406 together as the stack passes under roller 414, thus forming an electro-optic display. It will be seen from FIG. 10 that the lamination is arranged to that the conductive via 204 contacts the contact pad 410, while the electro-optic medium becomes disposed adjacent the pixel electrodes 408; it is of course necessary that the contact pad 410 be electrically isolated from the pixel electrodes 408 in order that the potentials applied to the common front electrode formed by the conductive layer of the front plane laminate and the pixel electrodes can be varied independently to generate electric fields across the electro-optic medium sufficient to change the optical state thereof.

The lamination process can be varied in numerous ways. For example, the stage 416 could remain stationary and the roller 414 move. Both the roller 414 and the stage 416 could be unheated, and the lamination adhesive pressure-activated by the pressure applied by the roller 414. If the lamination is to be conducted using the front plane laminate of FIG. 8 rather than that of FIG. 9, a deformable conductive material, for example a silver-filled epoxy resin, may be printed or otherwise deposited over the contact pad 410 so that during the lamination this deformable conductive material is forced into the aperture 202 (FIG. 8) thus forming a conductive via during the lamination process. The lamination could of course also be carried out using two rollers (heated or un-heated) rather than one roller and a stage.

More fundamental variations of the lamination process are also possible. The lamination process shown in FIG. 10 is a "piece-to-piece" process, in which individual cut pieces of front plane laminate are laminated to individual backplanes. However, the lamination process could also be effected in a roll-to-roll mode, with a web of front plane laminate being laminated to a web comprising multiple backplanes formed on a flexible substrate; such a web might make use of transistors formed from polymeric semiconductors, as described in certain of the aforementioned E Ink and MIT patents and published applications. Such a roll-to-roll lamination may be effected by passing the two webs through a nip between a pair of rollers, which may be heated or unheated, depending upon the type of adhesive used. It will be apparent to those skilled in conducting roll-to-roll processes that in such a roll-to-roll lamination removal of the release sheet from the front plane laminate could be conducted "in-line" by providing a take-up roller which applies tension to separate the release sheet from the front plane laminate, and on which the separated release sheet is wound. Such a roll-to-roll lamination process is also well-adapted for simultaneous lamination of a protective layer. Following the roll-to-roll lamination process, the combined "display" web will of course be cut to produce individual displays.

The lamination could also be effected in what may be termed a "web-to-piece" mode, with a continuous web of front plane laminate, stripped of its release sheet, being laminated to a plurality of backplanes arranged in an appropriate holder, with the web of front plane laminate later being cut to produce individual displays.

Care should be exercised in choosing the environmental conditions, such as relative humidity and temperature, under which the front plane laminate/backplane lamination is affected, since such conditions have been shown, at least in the case of encapsulated electrophoretic displays, to affect the optical performance of the display produced by the lamination. For such electrophoretic displays, it is recommended that the lamination be effected at 20 to 60 percent relative humidity, optimally at 40 percent relative humidity. Also, for such electrophoretic displays, preferably, the lamination process is carried out at about room temperature, e.g., in the range of 15 to 25° C. In addition to relative humidity and temperature, other environmental parameters are desirably controlled. The lamination process is desirably carried out in a clean room environment with a low particle count to improve manufacturing yields. The environment should also be electrostatic-free. Electrostatic discharge (ESD), which may occur due to the high generation of static when the release sheet is removed from the front plane laminate, may damage the backplane. To reduce the risk of ESD, an ion cannon or gun may be used to spray electrically neutralizing ionized particles on to the front plane laminate both while the front plane laminate is covered with the release sheet and after the release sheet has been removed and the front plane laminate is placed on the lamination stage or is being laminated in a roll-to-roll process. The ionized particles serve to discharge or electrically neutralize the front plane laminate. In addition, the lamination environment should be properly grounded, including grounding the operators, flooring, etc., to further reduce the risk of ESD.

It will be seen from FIG. 10 that after the lamination, even if a protective film has been applied, at least the edge of the electro-optic medium is exposed to the environment, and, as previously noted, many electro-optic media are susceptible to environmental factors, such as moisture, oxygen, and particulates. Accordingly, according to the present invention, the display may be sealed to prevent adverse effects on the electro-optic medium caused by such environmental factors, thus increasing the operating life of the display. Examples of useful seals are illustrated in FIGS. 11 to 17.

Figure 11:
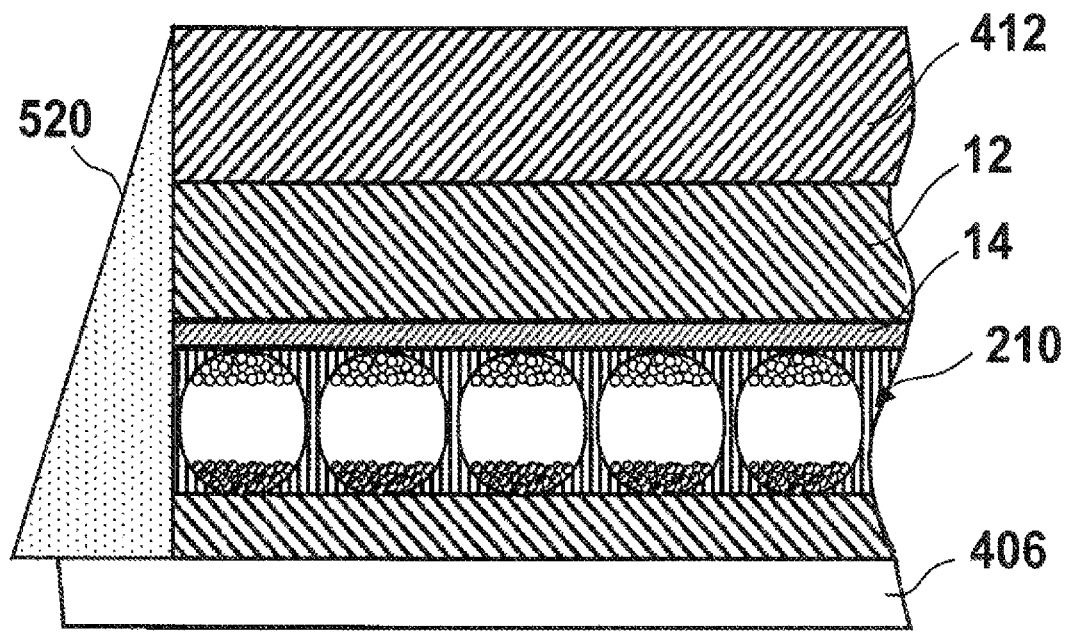
FIG. 11 is a schematic cross-section showing the final form of the first electro-optic display of the present invention.

FIG. 11 shows a "fillet" edge seal 520. (The pixel electrodes are omitted from FIGS. 11 to 17 for simplicity.) In this type of seal, both the substrate 12 and the protective layer 412 are of the same size as the electro-optic medium layer (measured parallel to the plane of the backplane 406) and the seal 520 is of substantially triangular cross-section, having a lateral thickness, measured parallel to the plane of the backplane 406, which decreases from the backplane 406 to the protective layer 412. The seal 520 extends from the surface of backplane 406 up to, but not past, protective layer 412, as shown in FIG. 11.

The seal 520, and the other seals shown in FIGS. 12 to 17, may be formed by dispensing an appropriate sealing material around the periphery of the electro-optic medium using standard dispensing machinery for manufacturing. For example, a conventional robotic needle dispenser may be used to dispense a seal 520 having a thickness of 0.3 to 0.6 mm and a width of 0.8 to 1.5 mm. Alternatively, the sealing material may be printed using standard printing processes, such as silk screening, stenciling, transfer, etc., on either front plane laminate 10 or backplane 406 before lamination.

The fillet seal 520 shown in FIG. 11 has advantages from a display processing and manufacturing standpoint, as it is easily integrated into the other steps used for manufacturing the display. The other edge seal geometries shown in FIGS. 12 to 17 require protective layer 412 (and in some cases, also the substrate 12) to be a different size from the layer of electro-optic medium, and such a size difference may require additional processing and/or manufacturing steps, which may complicate the overall display manufacturing process.

Figure 12:
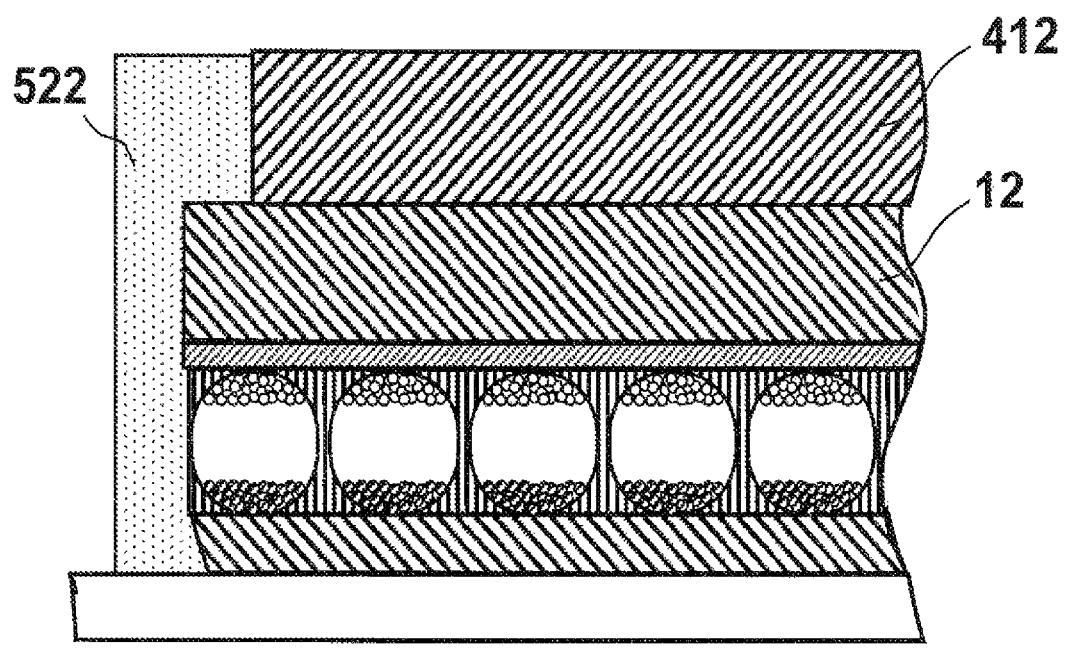
FIGS. 12 to 17 are schematic cross-sections, similar to that of FIG. 11, showing modified forms of the electro-optic display using differing sealing arrangements.

FIG. 12 illustrates an "overlap" seal 522. In this type of seal, the protective layer 412 is smaller than the layer of electro-optic medium (measured parallel to the plane of the backplane 406) and the sealing material extends over a peripheral portion of the layer of electro-optic medium and contacts the periphery of the protective layer 412. The seal 522 extends from the backplane 406 up to, but not past, protective layer 412, as shown in FIG. 12.

Figure 13:
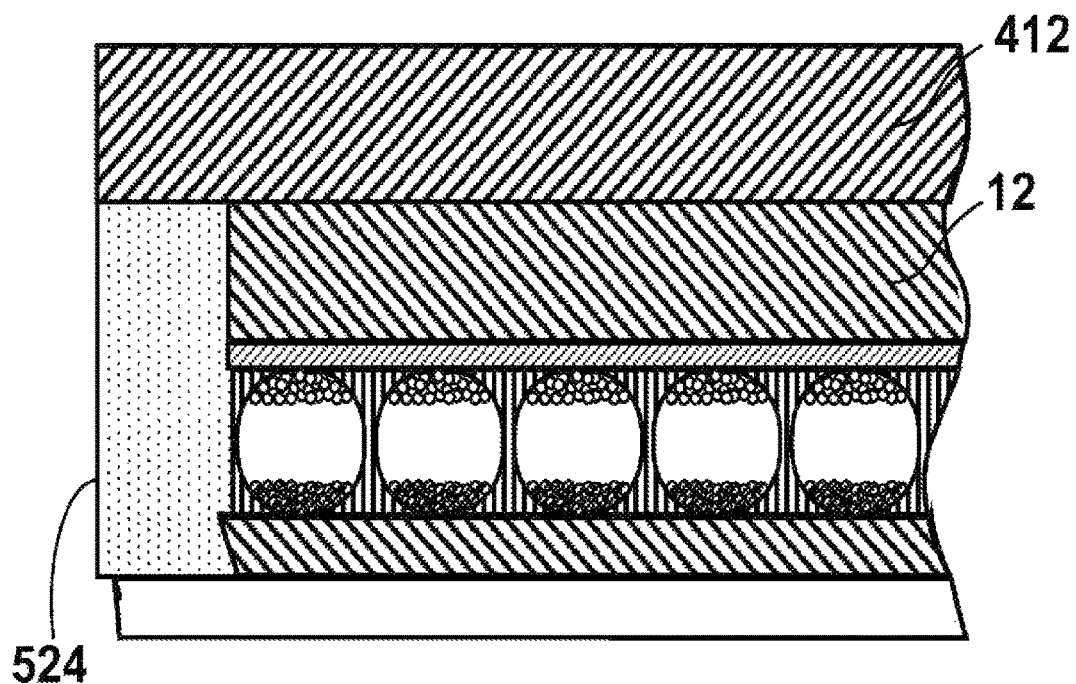

FIG. 13 illustrates an "underfill" seal 524. In this type of seal, the protective layer 412 is larger than the layer of electro-optic medium (measured parallel to the plane of the backplane 406) and the sealing material extends between the backplane 406 and the peripheral portion of the protective layer 412 extending beyond the periphery of the electro-optic medium and the substrate 12.

Figure 14:
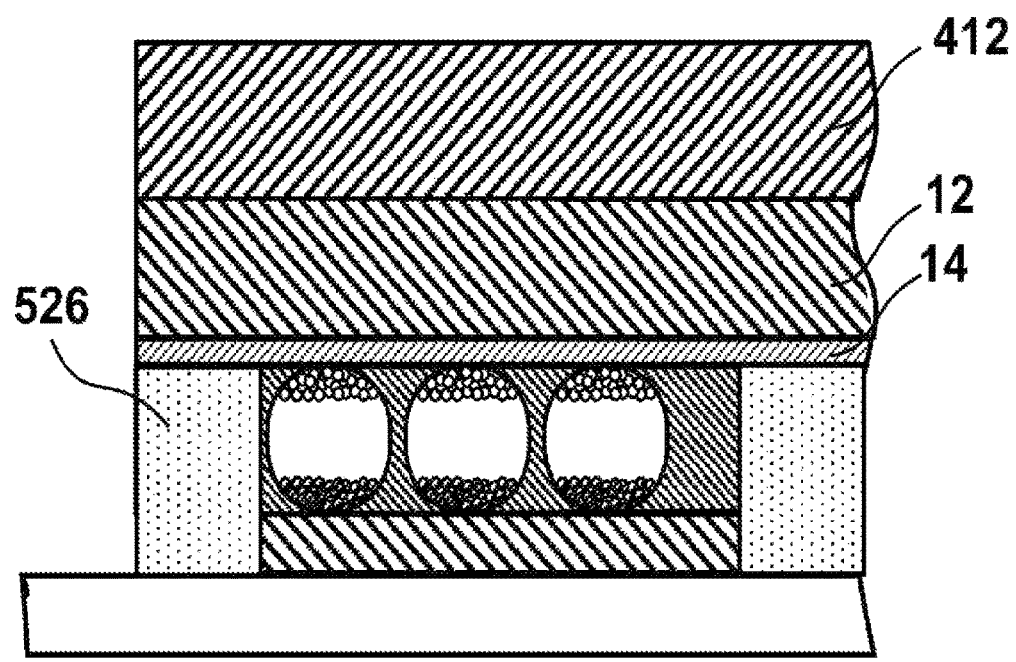

FIG. 14 illustrates a "true underfill" seal 526. In this type of seal, the protective layer 412, the substrate 12 and (optionally) the conductive layer 14 are all larger than the layer of electro-optic medium (measured parallel to the plane of the backplane 406), desirably by a distance of about 0.5 to 1.5 mm. The necessary "overhang" of protective layer 412, substrate 12 and conductive layer 14 may be provided by removing a peripheral portion of the layer of electro-optic medium from around the periphery of the display prior to the lamination of the front plane laminate 10 or 210 to the backplane 406. Also prior to this lamination, sealing material is dispensed around the periphery of the display, so that when the backplane 406 and front plane laminate 10 are laminated together, the edge seal 526 is formed. Alternatively, the sealing material may be applied after lamination by using capillary forces or direct pressure to fill the sealant into the small cavity around the electro-optic medium.

The underfill seals of FIGS. 13 and 14 are advantageous in that they only allow for diffusion of environmental factors in one dimension (left to right in FIGS. 13 and 14) through a substantial thickness of the sealing material before the environmental factors can reach the electro-optic medium 16. The protective sheet tends to be less susceptible to diffusion of environmental factors therethrough than the sealing material, and hence it is desirable to use an underfill seal which ensures that such environmental factors must diffuse in one dimension through a substantial thickness of the sealing material before they can reach and affect the electro-optic medium, as opposed to a type of seal which allows these factors to migrate in two dimensions into the electro-optic medium.

Figure 15:
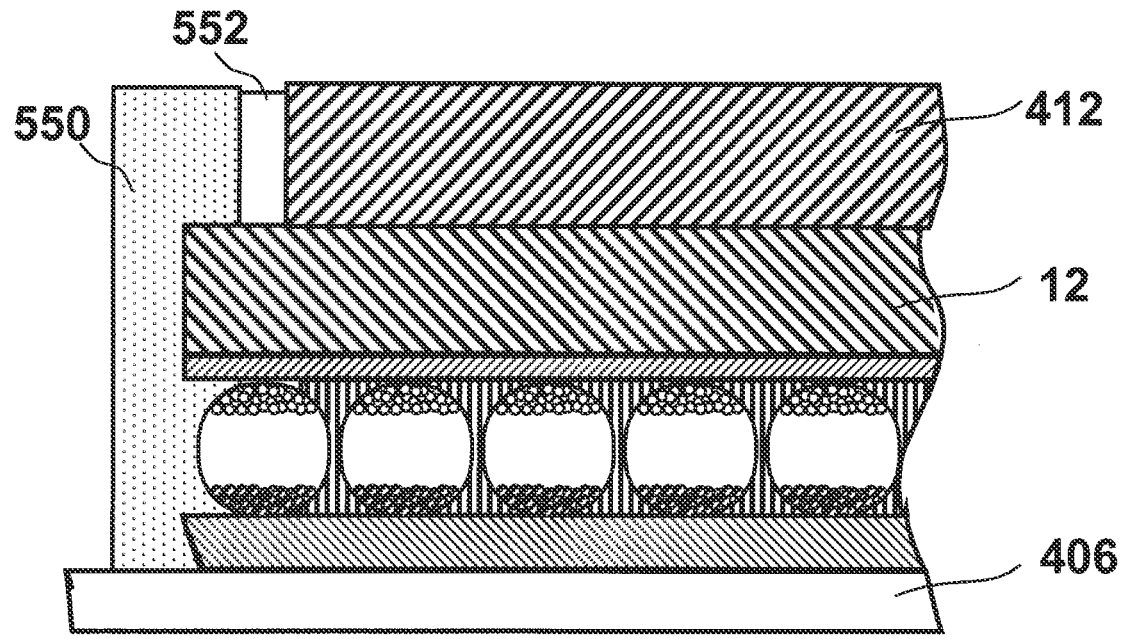

FIG. 15 illustrates a "non-contact overlap" seal 550. This type of seal closely resembles the overlap seal 522 shown in FIG. 12, but the sealing material does not extend to the edge of the protective film 412, leaving a gap between the sealing material and the protective film. Desirably, as shown in FIG. 15, a flexible sealant 522 is inserted into the gap to improve the sealing of the electro-optic medium 16. It has been found empirically that, in the overlap seal 522 of FIG. 12, there is a tendency for the sealing material to break away from the edge of the protective film, because of, for example, differences between the coefficients of thermal expansion of the various materials used in the display, and the differing degrees to which layers at differing distances from the backplane are constrained against lateral movement relative to the backplane. Formation of a break between the adjacent surfaces of the sealing material and protective film adversely affects the sealing of the electro-optic medium and hence the operating lifetime of the display. The non-contact overlap seal 550 allows for some relative movement between the sealing material and the protective film without adverse effects on the sealing of the electro-optic medium.

Figure 16:
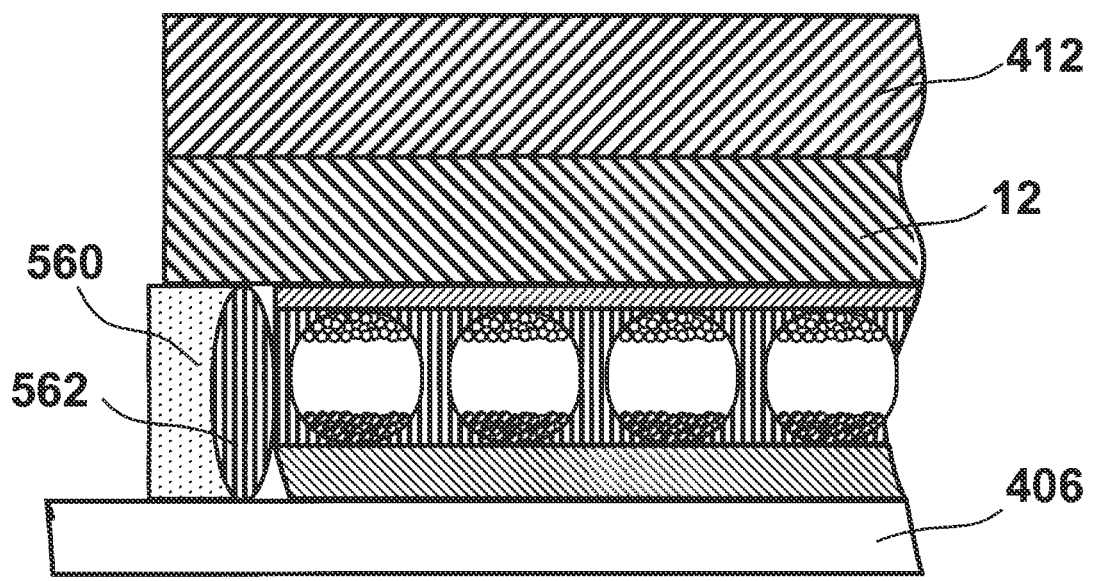

FIG. 16 illustrates an "underfill dam" seal 560. This type of seal closely resembles the true underfill seal 526 shown in FIG. 14. However, in the underfill dam seal 560, both the electro-optic layer and the conductive layer terminate short of the edge of the substrate 12, thus leaving a peripheral portion of this substrate 12 exposed. Also, the underfill dam seal 560 includes a protective dam 562. The dam 562 is formed from a curable material, for example an epoxy resin, which is dispensed on to either the backplane 406 or the front plane laminate, and cured before the backplane and the front plane laminate are laminated together, the dam 562 being positioned so that extends between the backplane 406 and the aforementioned exposed peripheral portion of the substrate 12.

Figure 17:
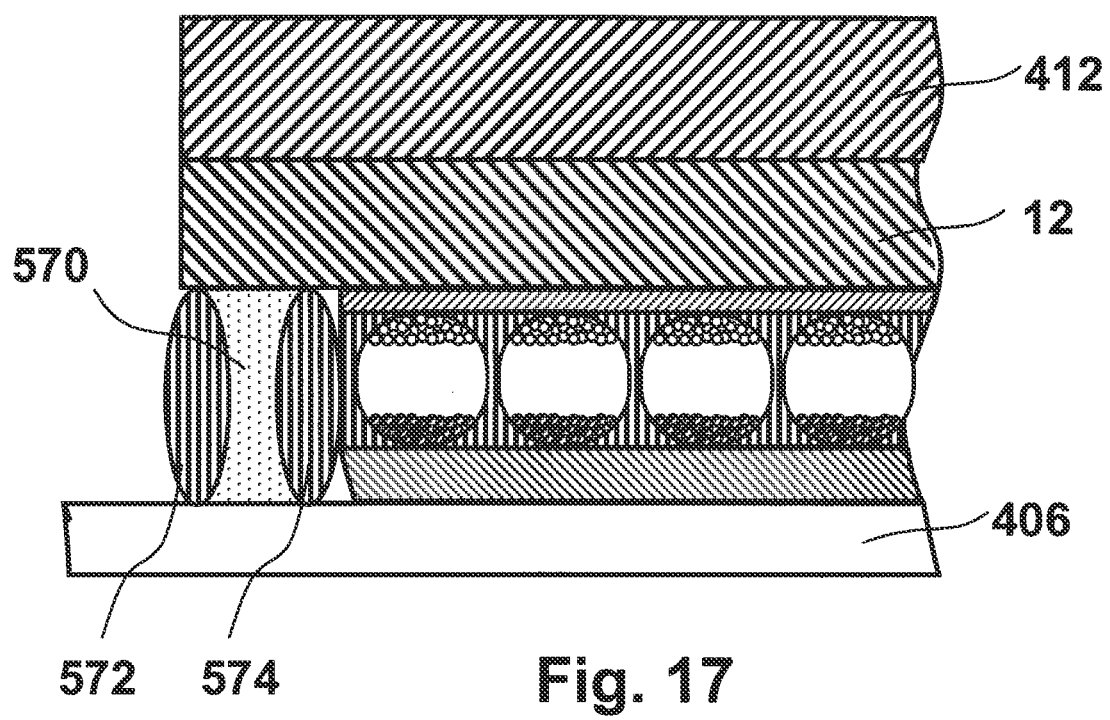

FIG. 17 illustrates an "channel" seal 570. This type of seal closely resembles the underfill dam seal 560 shown in FIG. 16, but uses two spaced beads 572 and 574 which are dispensed and cured prior to lamination of the backplane and front plane laminate to define a channel between the two beads. This channel is then filled with the sealing material, but before the lamination step.

In the seals shown in FIGS. 16 and 17, spacer beads may be introduced between the backplane and the front plane laminate to prevent extrusion (i.e., squeezing out) of the sealing material during the lamination step.

In some cases, it may be advantageous to apply an adhesion promoter to either the front plane laminate and/or the backplane prior to application of the sealing material to achieve improved adhesion of the sealing material to the backplane and front plane laminate.

If an edge seal alone does not provide sufficient protection against environmental factors, a barrier tape could also be applied. Such a barrier tape would preferably run around the perimeter of front plane laminate 10 to supplement the barrier properties of the edge seal 510. The barrier tape could be a die cut piece of adhesive backed polychlorotrifluoroethylene (sold commercially by Honeywell International, Inc. under the Registered Trade Mark Aclar), metallized PET, aluminum, or stainless steel. Similarly, an additional barrier film may be applied to the protective film to further enhance protection of the display against environmental factors. Similarly, an additional barrier film may be applied over the protective film 412 to further enhance the environmental integrity of the display.

Figure 18:
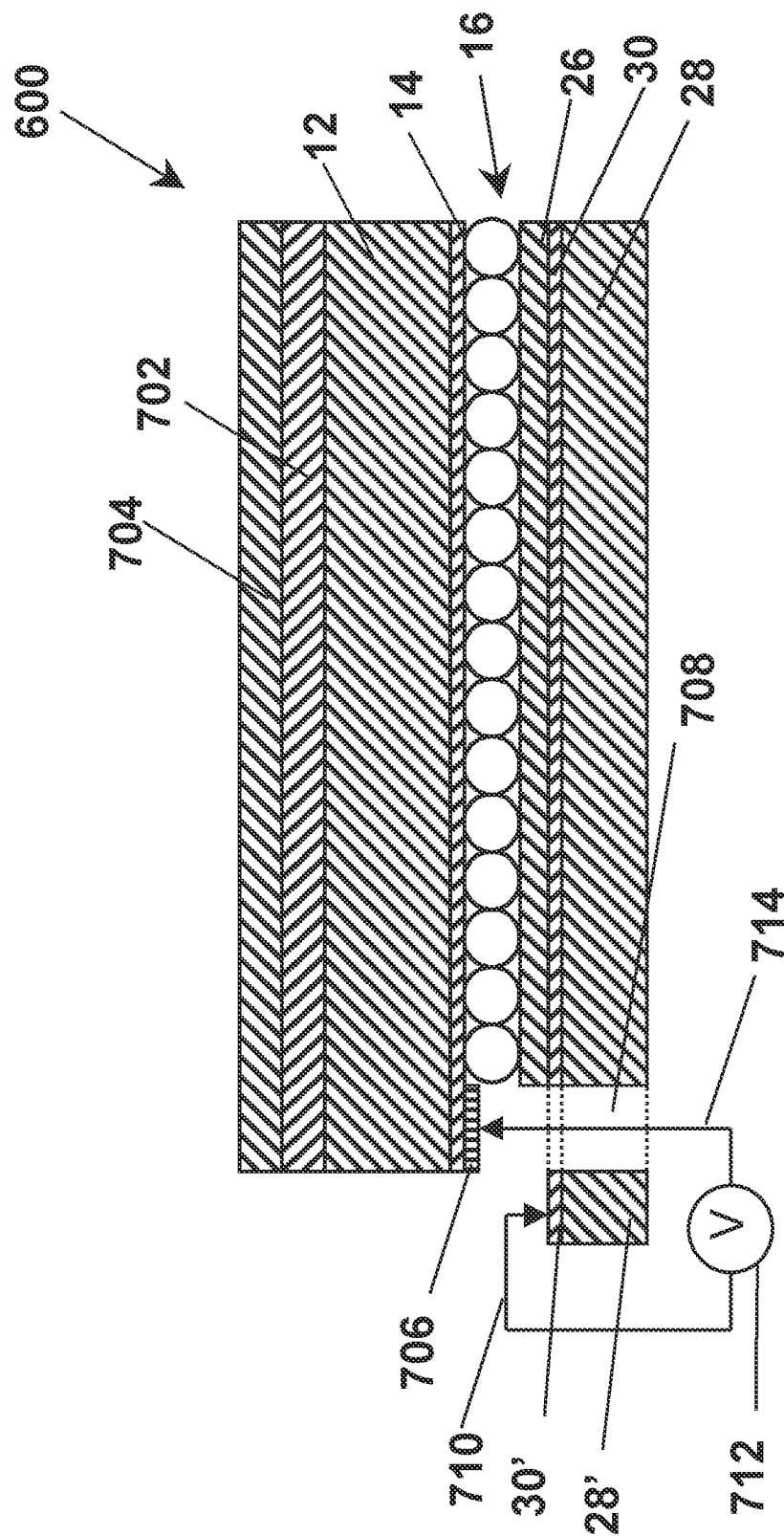
FIG. 18 is a schematic cross-section through a fifth front plane laminate of the invention, this front plane laminate being shown undergoing testing.

FIG. 18 shows a further front plane laminate (generally designated 600) of the present invention being tested by a method similar to that of FIG. 2. The front plane laminate 600 comprises a release sheet 28 provided with a conductive layer 30, an adhesive layer 26, an electro-optic medium layer 16, a conductive layer 14 and a substrate 12, all of which are essentially identical to the corresponding parts of the front plane laminate 10' shown in FIG. 2. However, the front plane laminate 600 further comprises an auxiliary adhesive layer 702 on the opposed surface of the substrate 12 from the conductive layer 14, this auxiliary adhesive layer 702 being formed from a transparent adhesive, and an auxiliary release sheet 704 on the opposed side of adhesive layer 702 from the substrate 12. The front plane laminate 600 also comprises a contact pad 706, formed from silver ink, on a peripheral portion of conductive layer 14. An aperture 708 is formed through release sheet 28 adjacent contact pad 706 and the portions of electro-optic medium layer 16 and adhesive layer 26 overlying contact pad 706 are removed, so that contact pad 706 is accessible from the exposed surface of release sheet 28 via aperture 708.

FIG. 18 shows the front plane laminate 600 being tested using essentially the same process as used in FIG. 2. It will be seen from FIG. 18 that a peripheral portion 28' of release sheet extends beyond substrate 12, thus leaving an area 30' of conductive layer 30 exposed. An electrical conductor 710 connects the area 30' to a voltage source 712, which is also connected to a second electrical conductor 714. Conductor 714 passes through aperture 708 and contacts contact pad 706, thus enabling the voltage source 712 to apply a voltage between conductive layers 14 and 30 and change the optical state of the electro-optic medium layer 16.

The front plane laminate 600 may be manufactured by first applying the auxiliary adhesive layer 702 and the auxiliary release sheet 704 to the substrate 12 already provided with conductive layer 14; as previously mentioned, conveniently substrate 12 and conductive layer 14 are constituted by a commercially available PET/ITO or similar composite film. The contact pad 706 is then printed on the exposed surface of the conductive layer 14. Next, the conductive layer 14, including the area occupied by contact 706 is coated with the electro-optic medium, followed by the adhesive layer 26, which is in turn covered by the release sheet 28 provided with the conductive layer 30. Finally, the aperture 708 is formed through the release sheet 28 and the adhesive layer 26 and the electro-optic medium layer 16 cleaned from the contact pad 706 in any of the ways already described above with reference to FIG. 2. The front plane laminate 600 is now ready for testing as illustrated in FIG. 18.

Figure 19:
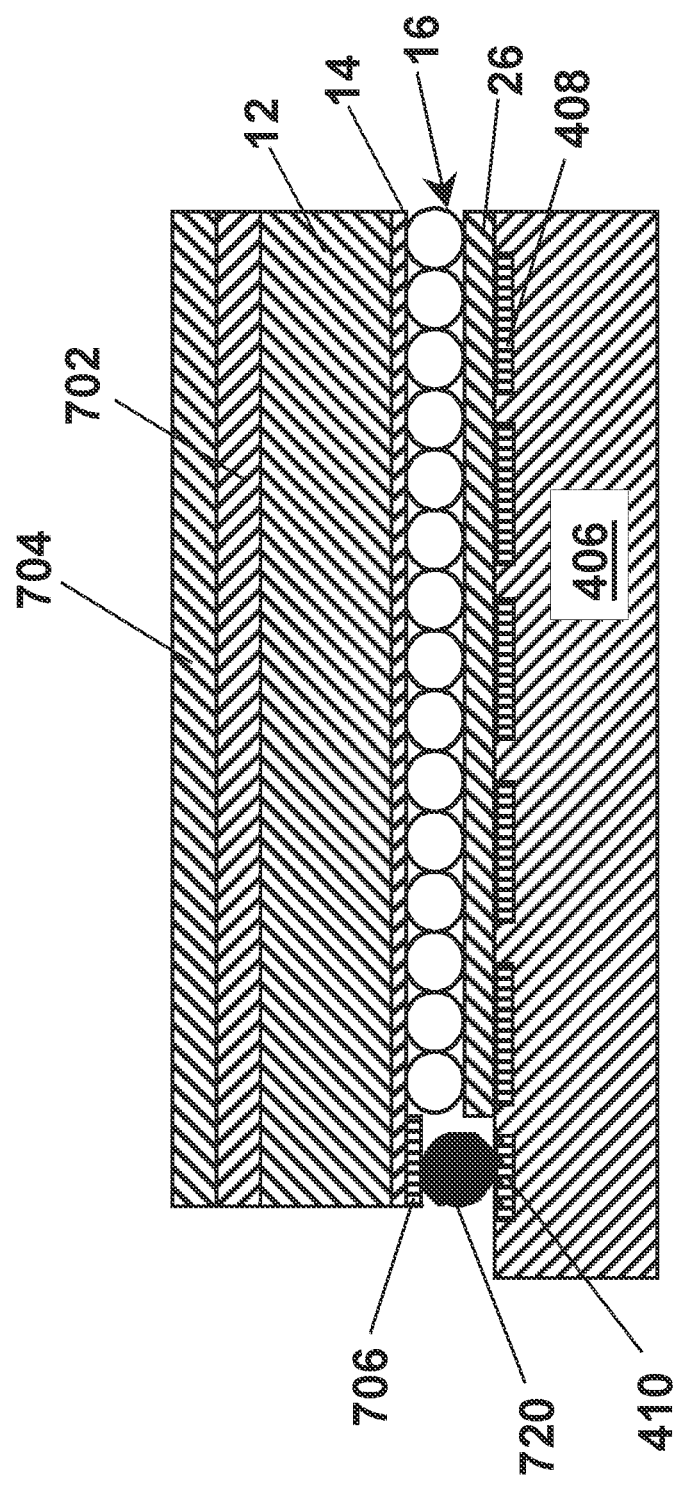
FIG. 19 is a schematic cross-section showing the front plane laminate of FIG. 18 being laminated to a backplane in a process of the present invention.

FIG. 19 illustrates to front plane laminate 600 of FIG. 18 laminated to a backplane 406 provided with pixel electrodes 408 and a contact pad 410, all of which are essentially identical to the corresponding parts of the backplane shown in FIG. 10. A conductor 720 formed from an electrically-conductive adhesive establishes electrical contact between the contact pad 706 of the front plane laminate 600 and the contact pad 410 of the backplane 406; this contact pad 410 is of course electrically isolated from the pixel electrodes 408. To produce the structure shown in FIG. 19, the electrically-conductive adhesive may be printed on to the contact pad 410, the release sheet 28 removed from the front plane laminate 600, and the backplane and front plane laminate laminated together using any of the techniques previously described.

Figure 20:
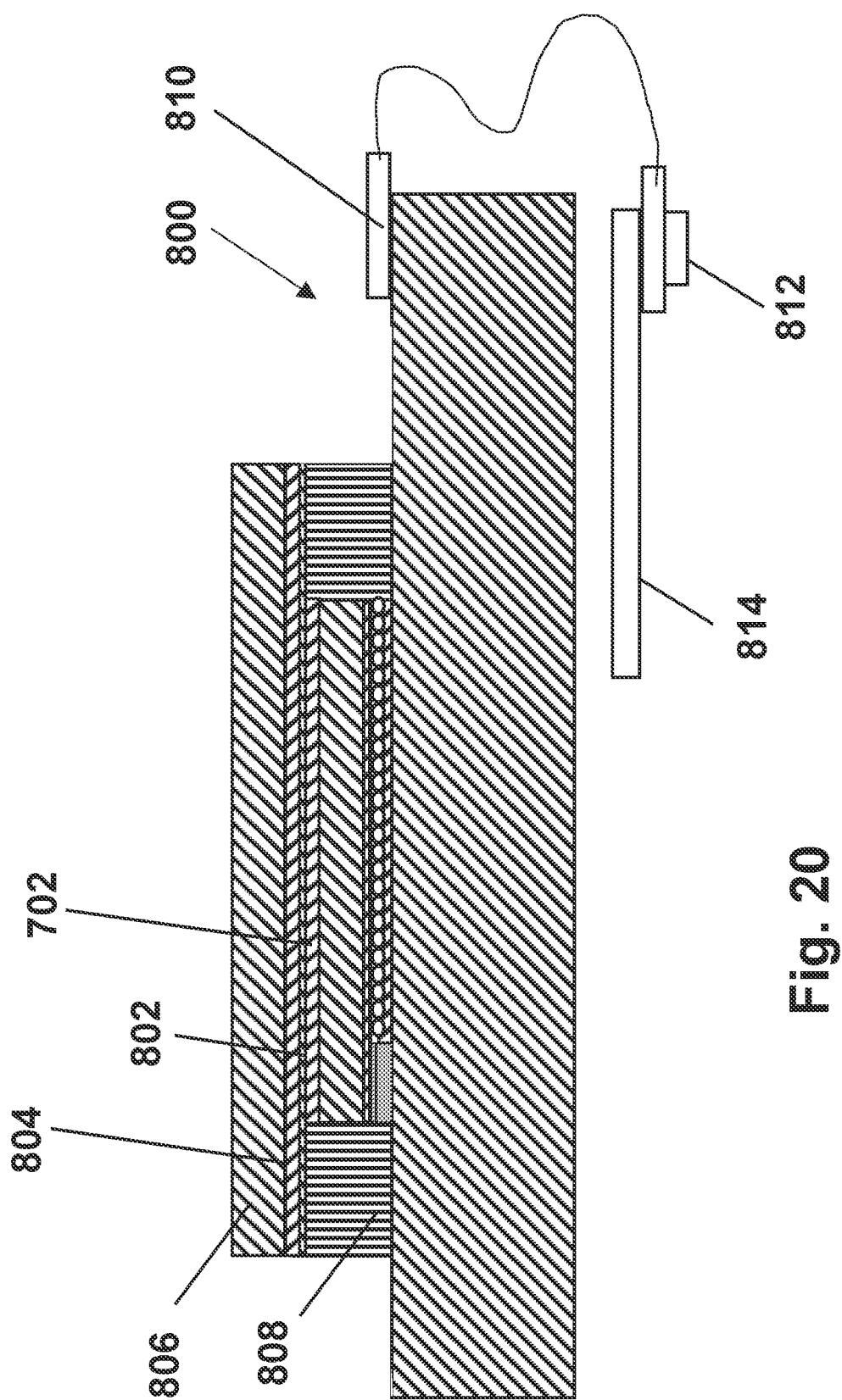
FIG. 20 is a schematic cross-section through the final electro-optic display produced by the process of which an intermediate stage is shown in FIG. 19.

FIG. 20 shows one form of display (generally designated 800) which can be prepared from the laminated structure shown in FIG. 19. To manufacture the display 800, the auxiliary release sheet 704 is removed from the auxiliary adhesive layer, and the front plane laminate/backplane structure (the contact pad 410 and the pixel electrodes 408 are omitted from FIG. 20 for ease of illustration) is then laminated to a barrier film 802, which is larger (parallel to the plane of the backplane 406) than the front plane laminate 600. A further protective film 802, preferably a PET film having a thickness of about 200 μm, and provided with a laminating adhesive layer, formed of a transparent adhesive, is then laminated to the exposed surface of the protective film 802. Next, a sealing material 808 is injected into the gap between the backplane 406 and the barrier film 802, thereby forming a type of underfill seal which is similar in principle to the seal 524 shown in FIG. 13, except that the sealing material 808 extends from the backplane 406 to the barrier film 802, rather than to the protective film 412.

Although not shown in the drawings, the backplane 406 is provided with circuitry which connects the pixel electrodes 408 and the contact pad 410 (FIG. 19) to a peripheral portion of the backplane, to which is attached a tape connect package 810 provided with a driver integrated circuit 812 (which controls the operation of the display); the tape connect package 810 is connected to a printed circuit board 814.

The specific displays described above with reference to FIGS. 2 to 20 use a front plane laminate having at least one aperture formed through the release layer, adhesive layer and layer of electro-optic medium, so that this aperture is completely surrounded by these layers. However, the use of such apertures is not essential. The release layer, adhesive layer and layer of electro-optic medium could be removed from an area which adjoins the periphery of the front plane laminate, so that the "aperture" has the form of a recess in the edge of the release layer, adhesive layer and layer of electro-optic medium. Alternatively, the exposed area of the conductive layer of the front plane laminate needed for electrical contact with the backplane may be provided not by removing the release layer, adhesive layer and layer of electro-optic medium, but by not coating a specific area of the conductive layer with these additional layers, as illustrated in FIGS. 21 and 22.

Figure 21:
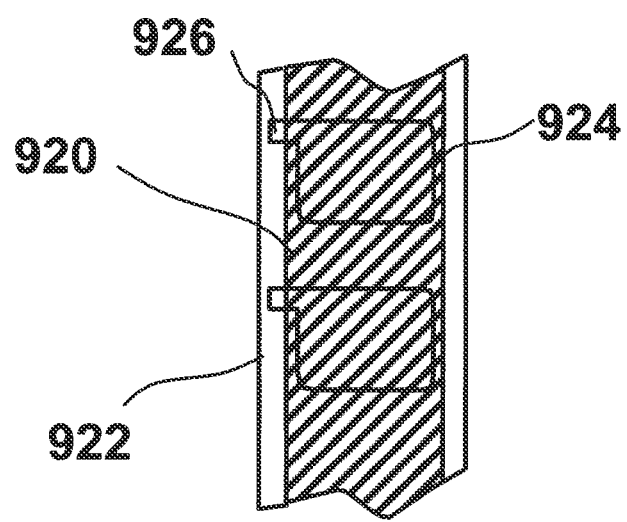
FIGS. 21 and 22 are schematic plan views of coating processes for forming front plane laminates of the present invention.
Figure 22:
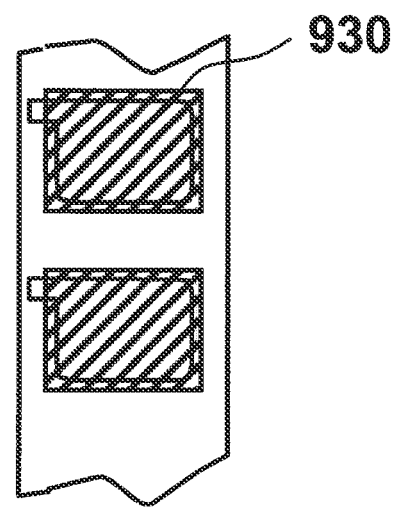

FIG. 21 illustrates a "lane" coating process in which a continuous strip 920 of an electro-optic medium is deposited on a web 922, which can form the substrate of a front plane laminate. Multiple areas of conductive material, only two of which are shown in FIG. 9, are provided on the web 922, each of these areas having the form of a rectangle 924, which is completely covered by the strip 920 of electro-optic medium, and a tab 926 extending from the rectangle 924 beyond the edge of the strip 920, so that part of the tab 926 is not covered by the electro-optic medium. Although not shown in FIG. 21, the adhesive layer of the front plane laminate is subsequently coated in the same pattern as the electro-optic medium, so that in the final web of front plane laminate, part of the tab 926 is free from both electro-optic medium and adhesive layer, so that there is no need to remove these two layers from a portion of the conductive layer before lamination of the front plane laminate to a backplane.

The exposed tab 926 of conductive material could be directly laminated to a suitable contact pad on the backplane. However, in general it is preferred, prior to the lamination, to coat a deformable conductive material, such as those previously described, on to the backplane so that this deformable conductive material lies between the contact pad on the backplane and the tab 926 to ensure good electrical contact between the contact pad and the tab.

It will be appreciated that considerable variation in the form of the conductive layer is possible in the process shown in FIG. 21. For example, the conductive layer could have the form of a continuous strip with tabs provided at regular intervals along one or both edges of the strip, so that the strip could be severed to provide pieces of front plane laminate suitable for individual displays and each having at least one tab. Alternatively, the conductive layer could have the form of a simple strip without tabs, and the electro-optic medium be coated in the form of a strip narrower than the strip of conductive material, thus leaving one or both edges of the conductive material exposed to provide connection areas which can contact the backplane when the front plane laminate is laminated thereto.

FIG. 22 illustrates a process similar to that of FIG. 21 but in which the electro-optic medium is applied as a series of patches 930 rather than as a continuous strip, with each patch 930 being used for one display. A modification of the process of FIG. 22 may be used to provide a front plane laminate suitable for use with the true underfill seal of FIG. 14. If the conductive layer is modified to extend over the whole surface of the web 922 of substrate material and the electro-optic medium is coated as appropriately-sized patches 930, severing the web 922 between adjacent patches will provide pieces of front plane laminate in which the substrate and conductive layer extend beyond the periphery of the layer of electro-optic medium all around the electro-optic medium, as required for formation of the true underfill seal of FIG. 14.

Optionally, in the process of the present invention, after lamination of the front plane laminate to the backplane and before or after formation of the seal (although the latter is typically preferred), the laminated structure produced may be autoclaved, that is put into an autoclave, which is a controlled environment chamber where the temperature and pressure can be increased to bake the structure. Such autoclaving facilitates the removal of small air voids in the laminated structure by forcing them out via heating. Alternatively, removal of voids may be effected by performing the lamination of the front plane laminate to the backplane under vacuum.

The process of the present invention can greatly simplify the manufacture of electro-optic displays and increases the throughput of a display manufacturing process by reducing the number of steps and materials required compared with conventional display manufacturing techniques, thus significantly reducing the cost of manufacturing such displays.

While the invention has been particularly shown and described with reference to specific preferred embodiments, it should be understood by those skilled in the art that various changes in form and detail may be made therein without departing from the spirit and scope of the invention. For example, the electrostatic chuck 42 shown in FIG. 4 could be replaced be a vacuum chuck, although a vacuum chuck does have the disadvantage of visible vacuum holes that would make detection of defects near the holes more difficult, and consequently it would probably be necessary to test each sheet of laminate twice in different positions on the chuck in order to detect defects that would be obscured by the vacuum holes in one position. Similarly, the line scan camera 52 could be replaced by a matrix camera and focusing optics. Accordingly, the foregoing description is to be construed in an illustrative and not in a limitative sense.

The invention claimed is:

1. An electro-optic display comprising:
a backplane comprising at least one pixel electrode;
a first and second layer of lamination adhesive;
a layer of electro-optic material between the first and second layer of lamination adhesive; and
an electrically-conductive layer on an opposing side of the electro-optic layer relative to the backplane,
wherein at least part of the periphery of the layer of electro-optic material is sealed.

2. An electro-optic display according to claim 1 further comprising a protective layer provided on the opposed side of the electrically-conductive layer from the second layer of lamination adhesive.

3. An electro-optic display according to claim 1 wherein the electro-optic material comprises a rotating bichromal member or electrochromic material.

4. An electro-optic display according to claim 1 wherein the electro-optic material comprises an electrophoretic material comprising a plurality of electrically charged particles disposed in a fluid and capable of moving through the fluid under the influence of an electric field.

5. An electro-optic display according to claim 4 wherein the electrically charged particles and the fluid are confined within a plurality of capsules or microcells.

6. An electro-optic display according to claim 4 wherein the electrically charged particles and the fluid are present as a plurality of discrete droplets surrounded by a continuous phase comprising a polymeric material.

7. An electro-optic display according to claim 4 wherein the fluid is gaseous.

* * * * *